(12) United States Patent
Joo et al.

(10) Patent No.: US 10,186,698 B2
(45) Date of Patent: Jan. 22, 2019

(54) CERAMIC-POLYMER HYBRID NANOSTRUCTURES, METHODS FOR PRODUCING AND APPLICATIONS THEREOF

(71) Applicant: CORNELL UNIVERSITY, Ithaca, NY (US)

(72) Inventors: Yong Lak Joo, Ithaca, NY (US); Daehwan Cho, Austin, TX (US); SangHo Lee, Somerville, NJ (US); Masakazu Kobayashi, Kakegawa (JP)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 15/101,548

(22) PCT Filed: Dec. 3, 2014

(86) PCT No.: PCT/US2014/068351
§ 371 (c)(1),
(2) Date: Jun. 3, 2016

(87) PCT Pub. No.: WO2015/084951
PCT Pub. Date: Jun. 11, 2015

(65) Prior Publication Data
US 2016/0308184 A1    Oct. 20, 2016

Related U.S. Application Data

(60) Provisional application No. 61/911,814, filed on Dec. 4, 2013.

(51) Int. Cl.
*D01D 5/36* (2006.01)
*D01F 1/10* (2006.01)
(Continued)

(52) U.S. Cl.
CPC ........ *H01M 2/145* (2013.01); *B01D 67/0041* (2013.01); *B01D 67/0079* (2013.01);
(Continued)

(58) Field of Classification Search
CPC ........ D01D 5/003; D01D 5/0038; D01D 5/36; D01F 1/10; D01F 11/04
(Continued)

(56) References Cited

U.S. PATENT DOCUMENTS 4,746,480 A    5/1988  Clark
2007/0144124 A1*  6/2007  Schewe ................ D01D 5/003
                                                          55/487

(Continued)

FOREIGN PATENT DOCUMENTS

CN    103120946 A    5/2013
WO    2014066310     5/2014

OTHER PUBLICATIONS

International Search Report and Written Opinion Form PCT/ISA/220, International Application No. PCT/US2014/068351, International Filing Date Dec. 3, 2014, Search Report dated Feb. 24, 2015, pp. 1-12.

*Primary Examiner* — Leo B Tentoni
(74) *Attorney, Agent, or Firm* — Bond, Schoeneck & King, PLLC; William Greener; Blaine Bettinger

(57) ABSTRACT

Provided herein are methods for forming nanofibers. The current disclosure provides ceramic nanofibers, morphology-controlled ceramic-polymer hybrid nanofibers, morphology-controlled ceramic nanofibers, core-sheath nanofibers and hollow core nanofibers using ceramic precursor materials and polymer materials which are combined and undergo electrospinning. The current disclosure provides for methods of forming these nanofibers at low temperatures such as room temperature and in the presence of oxygen and
(Continued)

moisture wherein the ceramic precursor cures to a ceramic material during the electrospinning process. Also disclosed are the nanofibers prepared by the disclosed methods.

36 Claims, 18 Drawing Sheets

(51) Int. Cl.
| | | |
|---|---|---|
| D01F 11/04 | (2006.01) | |
| H01M 2/14 | (2006.01) | |
| D01D 5/00 | (2006.01) | |
| C04B 35/622 | (2006.01) | |
| C04B 35/626 | (2006.01) | |
| C04B 35/632 | (2006.01) | |
| C04B 35/634 | (2006.01) | |
| C04B 35/636 | (2006.01) | |
| C04B 38/06 | (2006.01) | |
| B01D 67/00 | (2006.01) | |
| B01D 71/00 | (2006.01) | |
| B01D 71/02 | (2006.01) | |
| D04H 1/728 | (2012.01) | |
| H01M 2/16 | (2006.01) | |
| H01M 4/525 | (2010.01) | |
| H01M 10/0525 | (2010.01) | |
| H01M 4/02 | (2006.01) | |

(52) U.S. Cl.
CPC .......... *B01D 71/00* (2013.01); *B01D 71/024* (2013.01); *C04B 35/6224* (2013.01); *C04B 35/6269* (2013.01); *C04B 35/632* (2013.01); *C04B 35/634* (2013.01); *C04B 35/6365* (2013.01); *C04B 35/63468* (2013.01); *C04B 35/63488* (2013.01); *C04B 38/065* (2013.01); *D01D 5/003* (2013.01); *D01D 5/0038* (2013.01); *D04H 1/728* (2013.01); *H01M 2/1633* (2013.01); *H01M 4/525* (2013.01); *H01M 10/0525* (2013.01); *B01D 2323/39* (2013.01); *C04B 2235/3418* (2013.01); *C04B 2235/48* (2013.01); *C04B 2235/483* (2013.01); *C04B 2235/526* (2013.01); *C04B 2235/5296* (2013.01); *C04B 2235/5409* (2013.01); *H01M 2004/028* (2013.01)

(58) Field of Classification Search
USPC ..... 264/82, 83, 172.13, 211.13, 211.14, 465, 264/484, 555
See application file for complete search history.

(56) References Cited

U.S. PATENT DOCUMENTS

2011/0151736 A1    6/2011  Lee
2016/0248100 A1*   8/2016  Joo ..................... D01D 5/0007

* cited by examiner (a)

(b)

(a)

(b)

(a)

(b)

(a)

(b)

(c)

(a)

(b)

(c)

(a)

(b)

(c)

CERAMIC-POLYMER HYBRID NANOSTRUCTURES, METHODS FOR PRODUCING AND APPLICATIONS THEREOF

CROSS-REFERENCE

This application claims the benefit of U.S. Provisional Application No. 61/911,814, filed on Dec. 4, 2013 and entitled "Ceramic-Polymer Hybrids, Methods for Producing, and Applications Thereof," which is incorporated herein by reference in its entirety.

FIELD OF DISCLOSURE

The current disclosure relates to nanofibers, methods for forming nanofibers and uses thereof.

BACKGROUND OF THE DISCLOSURE

Ceramic-polymer hybrid materials have great potential for applications in a wide variety of fields, including membranes, high performance filtration, chemical sensing, biomedical engineering, renewable energy, batteries, membranes for Li-ion battery separators, capacitors, electrodes, solar cell applications, piezoelectrics, dielectric materials, macro- and micro-electronic materials, textiles, smart fibers, porous films, catalysts, absorbers, absorbers, membranes for filtration of materials such as pollutants, sensors, fabrics, smart fabrics, porous low-k dielectrics and other materials for the electronics and microelectronic industries and/or tissue regeneration matrices.

The process development of morphology-controlled ceramic-polymer hybrids, however, has been hindered by the difficulty associated with requiring high temperature calcination to form ceramics from ceramic precursors. Temperatures of calcination for useful ceramic materials can range from 350° C. to over 1000° C. Very few organic polymer materials can withstand these high temperatures so that the choice of ceramic-polymer hybrid materials is extremely limited thus limiting the usefulness of these types of materials. The technique is also limiting in the use of other ingredients such as metals, alloys, carbonaceous materials and the like, as metals can oxidize at the high calcination temperatures. Additionally in those cases where calcination is useful the temperature of calcination needs to be ramped from 0.1 degree per minute to 20 degrees per minute and the time to calcinate many of the materials can be as much as 5 hours to a number of days.

Some methods of creating structured materials (such as nanofibers) include drawing, template synthesis, phase separation, self-assembly and electrospinning. The drawing method can make one-by-one single structures. However, only a highly viscoelastic material that can undergo the strong deformations created while being cohesive enough to support the stresses developed during pulling can be made into elongated structures through drawing. The template process is hampered in that it cannot make one-by-one continuous nanostructures. The phase separation process consists of a series of elaborated processes including dissolution, gelation, extraction using a different solvent, freezing, and drying resulting in a nanoscale porous foam. The process takes a long period of time to transfer the solid polymer into the nano-porous foam. The self-assembly is a process in which individual, pre-existing components organize themselves into desired patterns and functions. However, similarly to the phase separation the self-assembly is time-consuming in processing continuous polymer materials.

Alternate methods prepare ceramic-polymer hybrid materials that contain pores, fill the pores with polymer precursors and allow the precursors to polymerize by a number of typical polymerization methods, the ceramic material being pre-formed. In these cases the filling of the pores can be inefficient and the polymerization of the polymer precursors confined within the space may only be partial.

Alternate methods of preparing ceramic-polymer hybrid materials are also limited by the solubility of the ceramic material in a suitable solvent. In some cases colloidal solutions are used to disperse the ceramic materials, but the amount of the ceramic component in the resulting hybrid materials are subsequently limited. The ceramic-polymer hybrid materials prepared alternate methods also suffer from lack of homogeneity (uniform distribution) in that the ceramic materials and polymer materials generally are not compatible and do not mix well.

SUMMARY OF THE DISCLOSURE

Disclosed and claimed herein are methods for forming ceramic-polymer hybrid nanofibers (e.g., morphology-controlled ceramic-polymer hybrid nanofibers), ceramic nanofibers (e.g., morphology-controlled ceramic nanofibers), core-sheath nanofibers and hollow core nanofibers. Such nanofibers are prepared using ceramic precursor materials (perhydropolysilazane and/or organopolysilazane) and may include polymer materials which are combined, the resultant composition undergoing electrospinning. In certain instances, the materials are electrospun at low temperature and in the presence of oxygen (air) and moisture wherein the ceramic precursor (perhydropolysilazane and/or organopolysilazane) cures to a ceramic material. In some instances curing may occur (or at least partially occur) during the electrospinning process. In further or alternative instances, complete (e.g., at least 95% or at least 99%) curing optionally occurs quickly following collection of the resultant nanofiber. In some embodiments, unlike other processing techniques, curing of the perhydropolysilazane and/or organopolysilazane to a ceramic can be achieved at a low temperature (e.g., at a temperature below the degradation temperature of the polymer), e.g., allowing for the facile manufacture of ceramic-polymer hybrid materials (nanofibers). Also disclosed are the nanofibers prepared by the disclosed methods.

In one embodiment, disclosed and claimed herein is a method for forming a ceramic nanofiber comprising the steps of providing a fluid stock comprising at least one ceramic precursor material (perhydropolysilazane and/or organopolysilazane) and electrospinning the fluid stock in the presence of air, water and an optional catalyst, such as an amine catalyst, onto a substrate; wherein at least one ceramic precursor (perhydropolysilazane and/or organopolysilazane) cures to a ceramic (e.g., during or at least partially during the electrospinning process) without the need for further thermal treatment (e.g., thermal treatment at a temperature above the degradation temperature of the polymer). In some embodiments, the electrospinning is performed at room temperature, at a temperature below 50° C., below 40° C., below 35° C., or any suitable temperature.

In another embodiment, disclosed and claimed herein is a method for forming a ceramic-polymer hybrid nanofiber comprising the steps of providing a fluid stock comprising at least one ceramic precursor material (perhydropolysilazane and/or organopolysilazane); providing a fluid stock comprising at least one polymer material; combining the fluid stocks (e.g., in an electrospinning mixing chamber); and electrospinning the combined fluid stocks in the presence of air, water and an optional catalyst, such as an, optional catalyst, such as an amine, catalyst onto a substrate. In some embodiments, the process is performed with pre-prepared fluid stock comprising a combination of ceramic precursor material (perhydropolysilazene and/or organopolysilazane) and polymer. In some instances, the at least one ceramic precursor cures to a ceramic (e.g., during the electrospinning process) without or without the need for further thermal treatment (e.g., thermal treatment at a temperature above the degradation temperature of the polymer).

In another embodiment, disclosed and claimed herein is a method for forming a ceramic mesoporous nanofiber comprising the steps of providing a fluid stock comprising at least one ceramic precursor material (perhydropolysilazane and/or organopolysilazane); providing a fluid stock comprising at least one polymer material; combining the fluid stocks (e.g., in an electrospinning mixing chamber); electrospinning the combined admixes in the presence of air, water and an optional catalyst, such as an optional catalyst, such as an amine, catalyst onto a substrate; and removing at least a portion of at least one of the polymer materials. In some embodiments, the process is performed with pre-prepared fluid stock comprising a combination of ceramic precursor material (perhydropolysilazene and/or organopolysilazane) and polymer. Generally, the combined resultant fiber cures to a ceramic-polymer hybrid nanofiber (e.g., during or partially during the electrospinning step) without or without the need for further thermal treatment (e.g., thermal treatment above the degradation temperature of the polymer). Removal of the polymer is achieved using any suitable process, such as by using an aqueous material, an organic solvent, ozonolysis and/or a thermal treatment.

In another embodiment, disclosed and claimed herein is a method for forming a ceramic-polymer core-sheath hybrid nanofiber comprising the steps of preparing a fluid stock comprising at least one ceramic precursor material (perhydropolysilazane and/or organopolysilazane); preparing a fluid stock comprising at least one polymer material; coaxially electrospinning the fluid stocks in the presence of oxygen, water and an optional catalyst, such as an amine, catalyst onto a substrate. In some embodiments, the process is performed with pre-prepared fluid stock comprising a combination of ceramic precursor material (perhydropolysilazene and/or organopolysilazane) and polymer. In some instances, the ceramic precursor (perhydropolysilazene and/or organopolysilazane) cures to a ceramic (e.g., during or at least partially during the electrospinning step) without or without the need of further thermal treatment (e.g., thermal treatment above the degradation temperature of the polymer).

In another embodiment, disclosed and claimed herein is a method for hollow ceramic-polymer core-sheath hybrid nanofiber comprising the steps of preparing a fluid stock comprising at least one ceramic precursor material (perhydropolysilazane and/or organopolysilazane); preparing a fluid stock comprising at least one polymer material; coaxially electrospinning the fluid stocks in the presence of oxygen, water and an optional catalyst, such as an amine, catalyst onto a substrate and removing at least a portion of at least one of the polymer materials. In some embodiments, the process is performed with pre-prepared fluid stock comprising a combination of ceramic precursor material (perhydropolysilazene and/or organopolysilazane) and polymer. In some instances, the at least one ceramic precursor (perhydropolysilazane and/or organopolysilazane) cures to a ceramic (a silicon oxide, such as silica) (e.g., during or at least partially during the electrospinning step) without or without the need of further thermal treatment (e.g., thermal treatment above the degradation temperature of the polymer). Generally, the polymer material is removed by any suitable process, such as using an aqueous material, an organic solvent, ozonolysis or a thermal treatment (e.g., to dissolve or degrade the polymer).

In another embodiment, disclosed and claimed herein are methods of the above embodiments further comprising the step of reducing the ceramic material.

In other embodiments, disclosed and claimed herein are methods of the above embodiments wherein the electrospinning of the fluid stocks is gas assisted (e.g., common-axially—"coaxially"—gas assisted).

In other embodiments, disclosed and claimed herein are methods of the above embodiments wherein the ceramic precursor material is perhydropolysilazane material or an organopolysilazane material which cures to a polysiloxane ceramic during the electrospinning process and/or after collection of the resultant fibers without the need for further thermal treatment (e.g., thermal treatment above the degradation temperature of the polymer).

In other embodiments, disclosed and claimed herein are the methods of the above embodiments wherein the temperature of electrospinning is below about 300° C. and the degree of cure after electrospinning is above about 75%.

In other embodiments, disclosed and claimed herein are methods of the above embodiments wherein the temperature of the electrospinning is room temperature. In certain embodiments, the temperature is below 50° C., below 40° C., below 35° C., or any other suitable temperature. In certain embodiments, processes described herein do not require or have further thermal treatment to cure the ceramic precursor to ceramic (e.g., a silicon oxide, such as silica), such thermal treatment being a temperature above the decomposition temperature of a polymer included, or a temperature above 100° C., 50° C., 40° C., 35° C., or the like.

In a further embodiment, disclosed and claimed herein are nanofibers prepared by any of the above methods, including ceramic nanofibers, silicon nanofibers, ceramic-polymer hybrid nanofibers, silicon-polymer hybrid nanofibers, mesoporous ceramic-polymer hybrid nanofibers, mesoporous silicon-polymer hybrid nanofibers, mesoporous ceramic nanofibers, mesoporous silicon nanofibers, core-shell ceramic-polymer nanofibers, core-shell silicon-polymer nanofibers, hollow ceramic nanofibers, hollow ceramic mesoporous nanofibers and hollow silicon nanofibers.

In some instances, the current disclosure relates to nanofibers, methods for forming nanofibers and uses thereof. More specifically, in certain instances, the current disclosure relates to morphology-controlled ceramic-polymer hybrid nanofibers, morphology-controlled ceramic nanofibers, core-sheath nanofibers and hollow core nanofibers using ceramic precursor materials and polymer materials, which are combined and undergo electrospinning. In even more specific instances, the current disclosure provides for methods of forming these nanofibers at low temperature and in the presence of oxygen and moisture wherein the ceramic precursor cures to a ceramic material during the electrospinning process. Also disclosed are the nanofibers prepared by or capable of being prepared by the disclosed methods.

DETAILED DESCRIPTION

Figure 1:
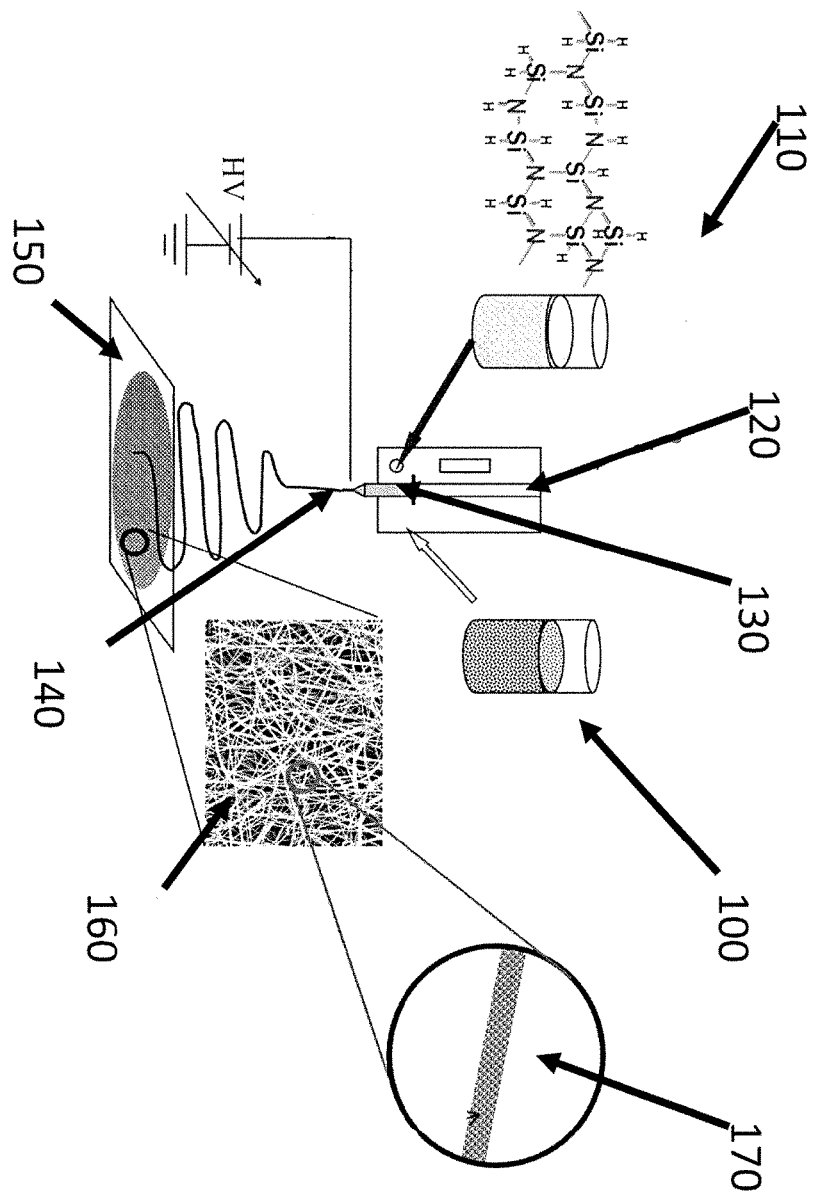
FIG. 1 illustrates one embodiment of the electrospinning process of the current disclosure in which a ceramic-polymer hybrid nanofiber is prepared.

As used herein, the conjunction "and" is intended to be inclusive and the conjunction "or" is not intended to be exclusive unless otherwise indicated. For example, the phrase "or, alternatively" is intended to be exclusive.

As used herein, the term "and/or" refers to any combination of the foregoing elements including using a single element.

As used herein the terms "composition" and "formulation" are used interchangeable and mean the same thing.

As used herein, the term "polymer" is understood to comprise a homopolymer, or a copolymer containing two or more monomer repeat units, or a block-copolymer.

As used herein the term "fluid stock" is understood to comprise solutions of a solute in a solvent, colloidal compositions, dispersions, suspensions, sol-gels, blends or other combinations of one materials combined with another in fluid form.

As used herein the term "ceramic nanofiber" includes nanofibers that are 100% ceramic as well as nanofibers that also contain polymeric material.

Disclosed and claimed herein are methods for forming nanofibers, including ceramic nanofibers, silicon nanofibers, ceramic-polymer hybrid nanofibers, silicon-polymer hybrid nanofibers, mesoporous ceramic-polymer hybrid nanofibers, mesoporous silicon-polymer hybrid nanofibers, mesoporous ceramic nanofibers, mesoporous silicon nanofibers, core-shell ceramic-polymer nanofibers, core-shell silicon-polymer nanofibers, hollow ceramic nanofibers, hollow ceramic mesoporous nanofibers and hollow silicon nanofibers.

The embodiments use a fluid stock comprising ceramic precursor materials and, when desired, a fluid stock comprising polymer materials. In some embodiments the fluid stocks are combined and undergo electrospinning, while in other embodiments the fluid stocks are coaxially electrospun without being combined. The materials are electrospun at low temperature, such as, for example, room temperature and in the presence of oxygen, moisture and an optional catalyst (e.g., curing catalyst to facilitate curing of a precursor to a ceramic), such as an amine catalyst wherein the ceramic precursor (perhydropolysilazane and/or organopolysilazane, and/or a sol or sol gel thereof) cures to a ceramic material without the need for further thermal treatment (e.g., thermal treatment above the degradation temperature of the polymer). In some embodiments, oxygen and moisture supplied by ambient air conditions is suitable for curing the ceramic precursors. In certain embodiments the electrospinning is gas assisted and some embodiments the moisture and oxygen may be supplied in a gas assisted manner using an electrospinner configured for gas assistance. In some embodiments, curing of the precursor material to a ceramic is completed during the electrospinning process. In other embodiments, curing of the precursor material to a ceramic occurs quickly following electrospinning (e.g., within one hour, 15 minutes, or the like).

In some instances, the electrospinning process is suitable for the mass production of one-by-one continuous nanofibers from a wide variety of polymers and polymer blends, whereas other processing techniques are not. In certain instances, the electrospinning provided herein provide nanofibers with high surface area with short diffusion length which allows for fast curing during the process. In some instances, the fiber morphology and/or processing steps provided by the electrospinning processes described herein allow the precursor to quickly cure (e.g., 5 times, 10 times, or the like more quickly than the curing of such precursors prepared in other morphologies, such as cast films).

Suitable ceramic precursor materials utilized herein are perhydropolysilazane (PHPS) and/or organopolysilazanes. In certain instances, the fluid ultimately electrospun comprises perhydropolysilazane (PHPS), organopolysilazanes, and/or products of perhydropolysilazane (PHPS) and/or organopolysilazanes that have begun the sol-gel process (e.g., sols and/or sol-gels of perhydropolysilazane (PHPS) and/or organopolysilazanes); descriptions of combinations of perhydropolysilazane (PHPS) and/or organopolysilazanes include all such materials, unless otherwise noted. Generally, reference to a PHPS or organopolysilazane fluid stock herein refers to a fluid stock comprising PHPS or organopolysilazane, and/or partially or fully formed sols or sol-gels thereof. In some instances, such precursors include materials which are capable of reacting with oxygen and/or moisture at low temperature (e.g., in the presence or absence of an optional catalyst, such as an amine) to provide ceramic materials without the necessity of high temperature curing (e.g., which is typically used to create a ceramic). In some instances, the polysilazanes react with oxygen and moisture from air in the presence of an optional catalyst, such as an amine catalyst, to form ceramic (e.g., dense silicon dioxide) films at room temperature. Examples of perhydropolysilazanes useful in the current disclosure are described in U.S. Pat. No. 4,397,828, U.S. Pat. No. 4,840,778, U.S. Pat. No. 4,720,532, U.S. Pat. No. 6,329,487, U.S. Pat. No. 4,312,970, U.S. Pat. No. 4,395,460, U.S. Pat. No. 4,788,309 U.S. Pat. No. 8,084,186 included here by reference for the perhydropolysilazanes and organopolysilazanes described therein.

Any suitable polysilazanes is optionally utilized, for example, in some instances, exemplary polysilazanes of the current disclosure may comprise a structure having a structural unit represented by the general formula:

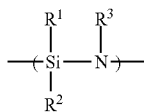

wherein $R^1$, $R^2$ and $R^3$ are each independently a hydrogen atom, or a substituted or unsubstituted, branched or unbranched hydrocarbon group. In one embodiment of the polysilazane at least one of $R^1$ and $R^2$ represents a hydrogen atom. The hydrocarbon group may be substituted with halogens such as chlorine, bromine and fluorine, an alkoxy group, an alkoxycarbonyl group, a silyl group or an amino group. Any of $R^1$, $R^2$ and $R^3$ may be a silicon containing group such as, for example, a siloxane, an organosiloxane, a silsesquioxane, an organosilsesquioxane, a POSS group (e.g., comprising one or more of the structural units: $RSiO_{1.5}$, wherein R is, e.g., a hydrocarbon), a silane, an organosilane, or other silicon containing substituents. In some instances, additional units may be present where two $R^3$ groups are optionally taken together to form a ring through one of the described groups (e.g., adjacent $R^3$ groups may be taken together to form a silane ($-SiH_2-$) group, forming a ring). The hydrocarbon group includes an aliphatic hydrocarbon group and an aromatic hydrocarbon group, and the aliphatic hydrocarbon group may include a chain hydrocarbon group and a cyclic hydrocarbon group. Examples of the hydrocarbon group include an alkyl group, an alkenyl group, a cycloalkyl group, a cycloalkenyl group, an aryl group, and an arylalkyl group. The number of carbon atoms in these hydrocarbon atoms is not limited, but is usually 20 or less, and preferably 10 or less. In the present invention, preferred is an alkyl group having 1 to 8 carbon atoms, and particularly 1 to 4 carbon atoms. In the hydrocarbon group-containing silyl group, a preferable hydrocarbon group is an alkyl group having 1 to 20 carbon atoms, and particularly 1 to 6 carbon atoms. In specific instances, the number of hydrocarbon atoms to be combined with Si is within a range from 1 to 3. In specific instances, the hydrocarbon containing amino group and hydrocarbonoxy group, the number of carbon atoms in the hydrocarbon group is within a range from 1 to 3.

The polysilazane having a silazane structure represented by the general formula (1) in a molecular chain may be a polysilazane having a chain, cyclic or crosslinked structure, or a mixture thereof. Additional units may be present where each $R^1$ or $R^2$ is optionally cross-linked to another monomeric unit of the general formula at the N group—e.g., through $R^3$—such cross-links may form links between separate linear chains, or form cyclic structures, such as illustrated in FIG. 1), or a mixture thereof. The number-average molecular weight is within a range from 100 to 100,000, and preferably from 300 to 10,000. Such a polysilazane includes conventional perhydropolysilazane, organopolysilazane, and a modified compound thereof.

The polysilazanes may be produced by any suitable method, such as those known in the art. One method, for example, is to react a dihalosilane represented by the general formula $SiR_1R^2X_2$ (X=F, Cl, Br, or I and $R^1$ and $R^2$ are described above) with a base in an inert atmosphere to form a dihalosilane adduct and then reacting the dihalosilane adduct with ammonia or $R^3-NH_2$ ($R^3$ being described above) at approximately 40° C. to 80° C. The reaction time and reaction pressure are not particularly limited.

Other polymer materials useful in the current disclosure may be polyamide resins, aramid resins, polyalkylene oxides, polyolefins, polyethylenes, polypropylenes, polyethyleneterephthalates, polyurethanes, rosin ester resins, acrylic resins, polyacrylate resins, polyacrylamides, polyvinyl alcohols, polyvinyl acetates, polyvinyl ethers, polyvinylpyrrolidones, polyvinylpyridines, polyisoprenes, polylactic acids, polyvinyl butyral resins, polyesters, phenolic resins, polyimides, vinyl resins, ethylene vinyl acetate resins, polystyrene/acrylates, cellulose ethers, hydroxyethyl cellulose, ethyl cellulose, cellulose nitrate resins, polymaleic anhydrides, acetal polymers, polystyrene/butadienes, polystyrene/methacrylates, aldehyde resins, cellulosic polymers, polyketone resins, polyfluorinated resins, polyvinylidene fluoride resins, polyvinyl chlorides, polybenzimidazoles, poly vinyl acetates, polyethylene imides, polyethylene succinates, polyethylene sulphides, polyisocyanates, SBS copolymers, polylactic acid, polyglycolic acid, polypeptides, proteins, epoxy resins, polycarbonate resins, coal-tar pitch petroleum pitch and combinations thereof. Polymer material useful in the current invention include polyethylene oxide (PEO), poly(meta-phenyleneisophthalamide) and polyacrylonitrile (PAN).

The polymer materials and ceramic precursor materials may be admixed into a fluid stock in a variety of solvents suitable for electrospinning Since the current methods employ low temperature electrospinning methods, as described below, the solvent should be volatile enough to evaporate readily while allowing the ceramic precursor and the polymer to form a fluid stock. Suitable examples include the $C_1$-$C_6$ alcohols including methanol, ethanol, 1-propanol, 2-propanol and the butanols; $C_4$-$C_8$ ethers, including diethyl ether, dipropyl ether, dibutyl ether tetrahydropyran and tetrahydrofuran; $C_3$-$C_6$ ketones, including acetone, methyl ethyl ketone and cyclohexanone; $C_3$-$C_6$ esters including methyl acetate, ethyl acetate, ethyl lactate and n-butyl acetate; and mixtures thereof. Other suitable solvents include halogenated hydrocarbons such as methylene chloride, chloroform, carbon tetrachloride, bromoform, ethylene chloride, ethylidene chloride, trichloroethane and tetrachloroethane; hydrocarbons such as pentane, hexane, isohexane, methylpentane, heptane, isoheptane, octane, decalin, isooctane, cyclopentane, methylcyclopentane, cyclohexane, methylcyclohexane, benzene, toluene, xylene and ethylbenzene. Mixtures of solvents may also be used. Additionally, colloids, dispersions, sol-gels and other non-solutions may be used.

The weight ratio of ceramic precursor to polymer may be any suitable ratio, such as range from about 100:0 to about 1:99, for example, from about 15:35 to about 15:50.

In some embodiments, amine catalysts useful for the current disclosure include aromatic N-heterocyclic amines; aliphatic N-heterocyclic amines; and branched or unbranched primary, secondary and tertiary aliphatic and aromatic amines.

In certain embodiments, specific examples of amine catalysts useful for the current disclosure include, for example, 1-methylpiperazine, 1-methylpiperidine, 4,4'-trimethylene-dipiperidine, 4,4'-trimethylenebis(1-methylpiperidine), diazabicyclo-[2,2,2]octane, cis-2,6-dimethylpiperazine, 4-(4-methylpiperidine)pyridine, pyridine, diperidine, α-picoline, β-picoline, γ-picoline, piperidine, lutidine, pyrimidine, pyridazine, 4,4'-trimethylenedipyridine, 2-(methylamino)pyridine, pyrazine, quinoline, quinoxaline, triazine, pyrrole, 3-pyrroline, imidazole, triazole, tetrazole, 1-methylpyrrolidine, methylamine, dimethylamine, trimethylamine, ethylamine, diethylamine, triethylamine, propylamine, dipropylamine, tripropylamine, butylamine, dibutylamine, tributylamine, pentylamine, dipentylamine, tripentylamine, hexylamine, dihexylamine, trihexylamine, heptylamine, diheptylamine, octylamine, dioctylamine, trioctylamine, phenylamine, diphenylamine, triphenylamine, DBU (1,8-diazabicyclo[5,4,0] 7-undecene), DBN (1,5-diazabicyclo[4,3,0] 5-nonene), 1,5,9-triazacyclododecane, and 1,4,7-triazacyclononane. These catalysts are included in an amount from about 0.5 to about 10% by weight based on the polysilazane.

It has surprisingly been found that in some instances by utilizing the methods herein disclosed, cured nanofibers that exhibit essentially no shrinkage can be prepared. Also the curing time for preparing ceramic materials from ceramic precursors can be significantly reduced (e.g., using the same precursors in other processing morphologies, such as films). As well, in certain applications that use the nanofibers, adhesion is improved compared to nanofibers prepared by the alternate methods. The electrospinning process involves the creation of submicron-scale fibers with large surface areas via an electric field.

Not to be held to theory, it is believed that in certain instances the reaction can be illustrated as:

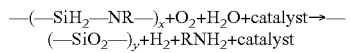

Electrospinning of nanofibers may be accomplished by any suitable method, such as the method set forth by Joo et al. in U.S. Patent Applications No. 20130040140 and 2013123137, incorporated herein by reference to the extent that it discloses the details of the methods of electrospinning and gas assisted electrospinning. Electrospinning uses an electrical charge to draw very fine fibers from a liquid typically on the order of micro or nano scale. Typically an electrospinning apparatus comprises a needle device such as, for example, a syringe containing the desired materials, connected to a high voltage, from about 5 to about 50 kV, direct current power source, a syringe pump and a grounded collection substrate. The desired materials in a fluid stock are extruded through the needle tip at a constant rate by the syringe pump. When a sufficiently high voltage is applied to a liquid droplet, the body of the liquid becomes charged, and electrostatic repulsion counteracts the surface tension and the droplet is stretched. At a critical point a stream of liquid erupts from the surface, known as the Taylor cone. With high enough molecular cohesion of the liquid a charged liquid jet is formed. As the jet dries in flight, the mode of current flow changes from ohmic to convective as the charge migrates to the surface of the fiber. The jet is then elongated by a whipping process caused by electrostatic repulsion initiated at small bends in the fiber, until it is finally deposited on a grounded collector. The elongation and thinning of the fiber resulting from this bending instability leads to the formation of uniform fibers with nanometer scale diameters. In some instances, due to the large surface area provided by the electrospinning process, reaction time and rates are improved so that further processing, such as high temperature treatments are not required to effect curing of the ceramic precursors (PHPS or organopolysilazane).

FIG. 1 illustrates an exemplary electrospinning process showing one embodiment of the current disclosure. A polymer fluid stock 100 and a precursor (e.g., perhydropolysilazane as illustrated, or an organo derivative thereof—such as wherein one or more hydrogens are substituted, e.g., as described herein, such as with hydrocarbon(s)) 110 fluid stock are prepared and mixed, such as in a syringe 130. In other variants, polymer and precursor are optionally combined directly into a single fluid stock. An apparatus for providing a fluid stock to an electrospinning nozzle, such as the illustrated syringe pump 120 pumps, provides a stream of the admixed fluid stocks which is charged by a high voltage direct current source HV. The extruded admix 140 which contains the ceramic precursor reacts at room temperature with ambient air and moisture in the presence of an optional catalyst, such as an amine catalyst to cure into a ceramic. In some instances, the curing process begins quickly (e.g., during the extrusion step) and, depending on the kinetics of the reaction, may be partially or completely cured as the fiber is collected by the substrate 150 to give a mat 160 of hybrid nanofibers 170 (e.g., comprising polymer—such as a polymer matrix—and a silicon oxide, such as silica). The curing process may start at the extrusion stage and be completed after collecting onto the substrate after a certain cure period.

The currently described electrospinning methods for making ceramic-polymer hybrid nanofibers do not require elevated temperatures, such as, for example, temperatures that may cause the degradation of the polymer. The degree of curing the ceramic precursors of the current disclosure is above about 75%, such as above about 85%, such as above about 95% and above. Thus, a variety of polymer materials can be chosen including those that either decompose, cross-link or undergo other undesirable changes when exposed to high temperature processing, such as, for example, polyethylene oxide polymers and co-polymers. Temperatures ranging up to about 300° C. (e.g., from about room temperature to about 300° C.) can be used in the current methods depending on the polymers chosen and the desired nanofiber properties. As well, substrates which are thermally sensitive may be used since the materials which are electrospun are not at high temperature.

Temperature sensitivity means not only decomposition at elevated temperatures but also melt/viscosity issues. For example, a polymer whose softening point is low will not survive any high temperature treatments such as, for example, the calcination process.

Various polymers can be chosen to be blended with polysilazanes to create desired morphology within the fiber so that material properties such as mechanical strength, dimensional stability and ionic conductivity can be tailored.

In other embodiments of the current disclosure, ceramic-polymer hybrid nanofibers may undergo further processing. For example the polymer material may be fully or partially removed to prepare an essentially all-ceramic nanofiber (e.g., comprising at least 90%, at least 95%, at least 98% by weight ceramic), such as, for example an essentially all-silicon oxide (e.g., silicon dioxide or substochiometric silica) and/or siloxane ceramic nanofiber. If more than one polymer is included in the polymer material, one of the polymers may be removed and not the other. The polymer material may be removed by any of a number of removal processes, such as, for example, dissolution of the polymer material in a solvent such as a water based removal treatment which may include acids, bases, surfactants, dispersants, salts, and other chemistries which will aid in the removal of the polymer from the nanofiber. Water-organic solvent blends may be used to remove the polymer as well as 100% organic solvents alone or blended with other organic solvents. Depending on the chosen polymer, heat treatments may be used to volatilize, or decompose the polymer into easily removable components such as gasses, volatile components or materials which can be readily solubilized in a solubilizing medium, as well as ozonolysis to break down the polymer for easy removal.

In other embodiments, the nanofibers may be further processed, such as, for example, by reduction. In certain embodiments, nanofibers that contain polysiloxane after electrospinning may be further treated by a reduction process to obtain nanofibers that comprise silicon metal. The reducing environment may comprise a reducing metal such as Mg under vacuum and the reducing environment may further comprise hydrogen gas ($H_2$) which may include an inert gas in various proportions. In this manner silicon nanofibers, silicon-polymer hybrid nanofibers, mesoporous silicon nanofibers, mesoporous silicon-polymer hybrid nanofibers, silicon-polymer core-sheath nanofibers, mesoporous silicon-polymer core-sheath nanofibers, silicon hollow nanofibers and mesoporous silicon hollow nanofibers may be obtained.

Figure 2:
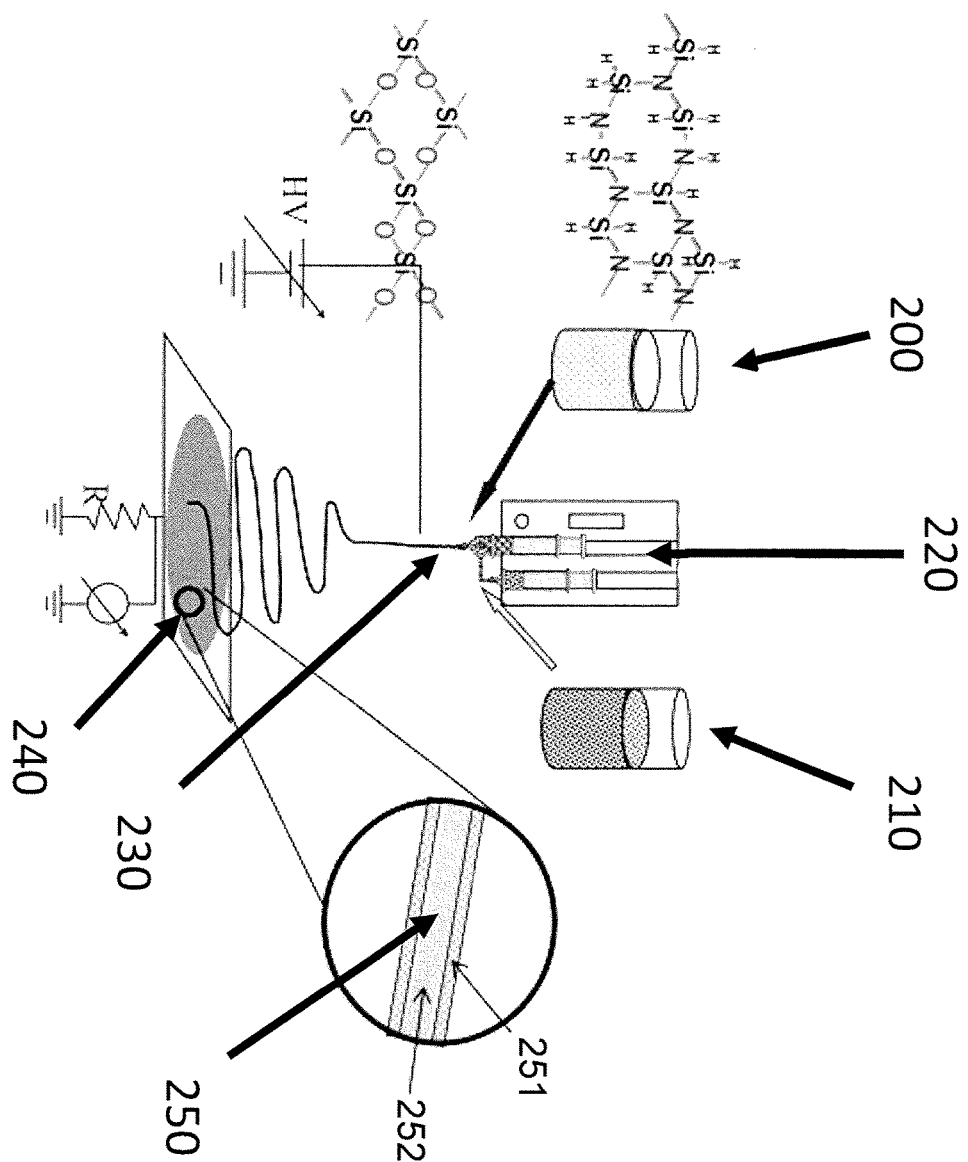
FIG. 2 illustrates one embodiment of the electrospinning method of the current disclosure in which a coaxial core-sheath ceramic-polymer hybrid nanofiber is prepared.

In other embodiments of the current disclosure a ceramic-polymer core-sheath hybrid nanofiber is provided. FIG. 2 illustrates an exemplary electrospinning in which a coaxial core-sheath ceramic-polymer hybrid nanofiber is prepared. A polymer fluid stock 210 is prepared and placed in an apparatus for extruding the fluid stock out of a first electrospinning nozzle channel (e.g., a first syringe). An precursor (e.g., PHPS as illustrated or organopolysilazane, or organopolysilazane/catalyst) 200 fluid stock is prepared and placed in a second apparatus for extruding a fluid stock out a second electrospinning channel (e.g., a second syringe). The dual channel nozzle system (e.g., a dual syringe system) 220—typically with one channel surrounding the other (a coaxial configuration)—extrudes the fluid stocks into a fiber tip, for example configured such that the precursor (e.g., organopolysilazane) material extrudes as an outer coating to the polymer material inner core. A syringe pump pumps a stream of the fluid stocks which is charged by a high voltage direct current source HV. The coaxially extruded admix 230 which contains the ceramic precursor on the outside reacts at room temperature with ambient air and moisture in the presence of an optional catalyst, such as an amine catalyst to cure into a polysiloxane ceramic to form a silicon oxide material (e.g., a silicon dioxide material as illustrated or other silicon oxide form—reference to silica herein is intended to refer to any silicon dioxide form and include a disclosure, when discussed in the specification, to any silicon oxide form unless otherwise stated). The coaxial nanofiber 250 comprising a core (e.g., comprising a silicon oxide (e.g., silica) cured from the precursor) 251/sheath (e.g., comprising a polymer, such as a high strength, high melt polymer) 252 structure is collected by the substrate 240. Extrusion tips for coaxially and multi-axially extruding fibers as a binary, ternary and other configurations are well known in the art and are included here. See, for example, PCT/US2011/24894 incorporated herein by reference for the coaxial electrospinning techniques described therein. The core-shell nanofiber may be further processed to remove the polymer inner core using such techniques as described above for removing polymer. In this manner hollow ceramic nanofibers, both mesoporous and solid-walled nanoparticles may be obtained. The hollow nanofibers may be reducing using such techniques as described above to provide hollow silicon nanofibers.

In other embodiments of the current disclosure, gas assisted electrospinning may be employed. Gas-assisted electrospinning comprises expelling a stream of gas at high velocity along with the materials for preparing the nanofibers, and can be a stream inside the materials or surrounding the materials. The gas may be air, oxygen, oxidizing, reducing, inert or other material and may contain added moisture, thereby assisting in the curing of the ceramic materials. The gas assistance increases the throughput of the method and/or reduces the diameter of the nanofiber produced. In some instances the gas assist accelerates and elongates the jet of ceramic precursor and/or polymer materials emanating from the electrospinner. PCT/US11/24894 is included herein by reference for the gas assisted electrospinning processes and apparatus therein described. Gas-assisted electrospinning provides for high production rates of the nanofibers as the high speed gas stream, not only produces more fiber, but it has been found that gas-assistance allows in some instances morphology control of the fibers, such as allowing in some instances for thinner fibers than can typically be obtained.

In other embodiment, disclosed and claimed herein are nanofibers prepared by the above disclosed and claimed methods. In some embodiments, the nanofibers have a surface area of at least 10 $m^2/g$. The fibers are substantially contiguous along the entire length of the nanofiber meaning that at least 80%, at least 90%, at least 95%, or at least 99% of the length of the nanofiber is contiguous.

The mesoporous nanofibers prepared by the methods of the current disclosure may have a plurality of pores ranging from mesopores, having diameters of between about 2 to about 50 nm, to micropores, having diameters of at least 1 nm, and macropores having diameters greater than 50 nm and mixtures of diameters thereof. The have a porosity of at least 20% and are substantially flexible or at least non-brittle and can be deformed from at least about 5% to about 50% without breaking. The pores the porous nanofiber are at least 1 nm and may be ordered or random, have uniform shapes and sizes or may be random, such as, for example, spheres, ovoids, ovals, cubes, cylinders, cones, and polyhedrons.

The nanofibers prepared by the methods of the current disclosure may be from about 50 nm to about 2 microns in length and have an aspect ratio of above about 100. The aspect ratio is defined as the ratio between the length and the width of the material, so that, in a fiber, an aspect ratio of 100 means the length of the fiber is 100 times larger than the width of the fiber.

Low temperature curing of the ceramic precursors allow for negligible volume change, such volume change typically occurs in high temperature calcination processes. Large volume changes can lead to adhesion issue, uniform distribution issues, and problems with mechanical strength. The nanofibers prepared by the methods of the current invention exhibit essentially no shrinkage when they are subjected to increased temperature. In some embodiments, there is "essentially no shrinkage" when a material shrinks (e.g., by mass and/or volume) less than about 5% (e.g., less than about 3% or less than about 1%), such as when subjected to increases in temperature. This is exemplarily illustrated (by mass) in FIG. 3b. This feature is important for a variety of applications that can use the fibers of the current disclosure, such as, for example, as a lithium battery separator. A primary goal for the separator within the lithium ion battery is to keep the anode removed from the cathode and to moderate the rate of the reaction occurring between the structures. For instance, when high rates are applied, the temperature within the battery can rise dramatically thereby increasing the kinetics of the de-lithiation from the cathode. In turn, a runaway reaction can be generated further increasing the temperature. This can subsequently result in a phase change in the electrolyte, fires, explosions, and catastrophes for battery users. In turn, generating a separator where the temperature can be moderated, while minimizing shrinkage is crucial. Thus the nanofibers of the current disclosure provide for separators that show essentially no shrinkage.

FIG. 3a shows an SEM image of silica nanofibers prepared from the method described in the current disclosure, from electrospinning of PHPS in dibutyl ether solution. FIG. 3b shows a thermo-gravimetric analysis (TGA) of the silica fiber prepared from the method described in the current disclosure 301 (using in this example PHPS) compared to an electrospun nanofiber made from tetraethyl orthosilicate (TEOS) precursor 302. As can be seen the fiber from the TEOS loses a significant amount of weight indicating that the fiber is continuing to cure while the fiber from the current method remains essentially at the same weight indicating that there is no further curing taking place. Thus the methods of the current disclosure provide cured ceramic nanofibers without the need for further pyrolysis.

Figure 4:
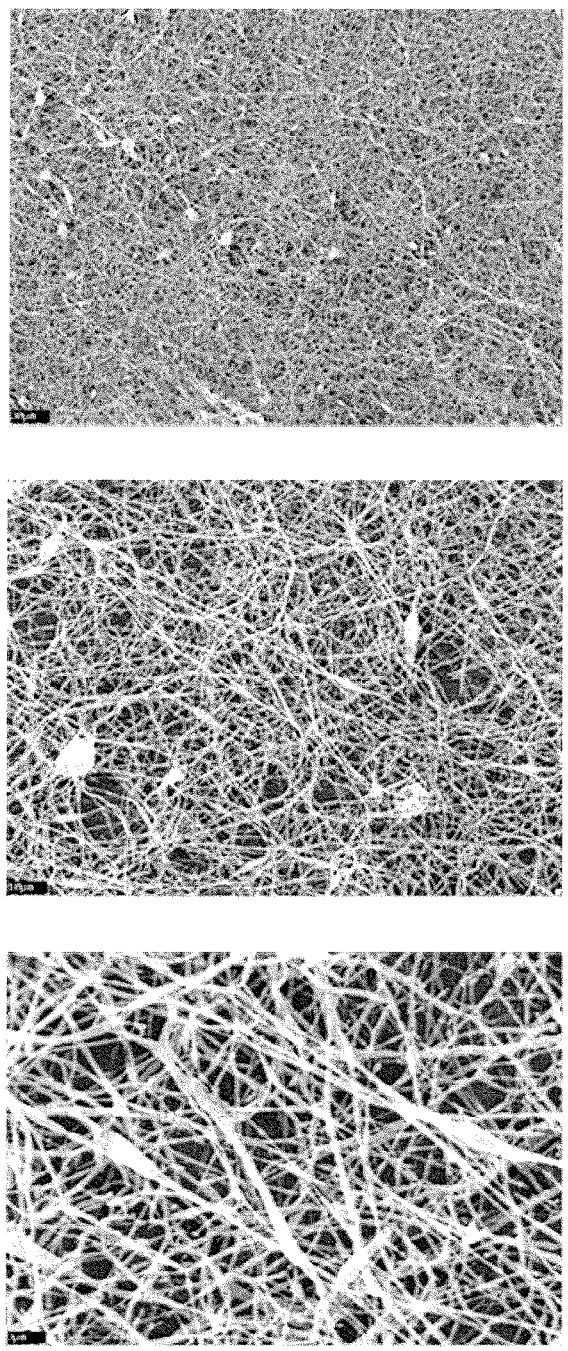
FIG. 4 shows SEM images of PHPS/PEO hybrid nanofibers at low molecular weight.

FIG. 4 shows examples of SEM images at a variety of magnification levels of PHPS/PEO hybrid nanofibers prepared by the currently disclosed methods. Low molecular weight (100,000) of PEO, 7 wt % in THF/EtOH was mixed with PHPS solution at a ratio of 1:0.5 PEO:PHPS. As can be seen the nanofibers are substantially contiguous, flexible and with a high aspect ratio.

Figure 5:
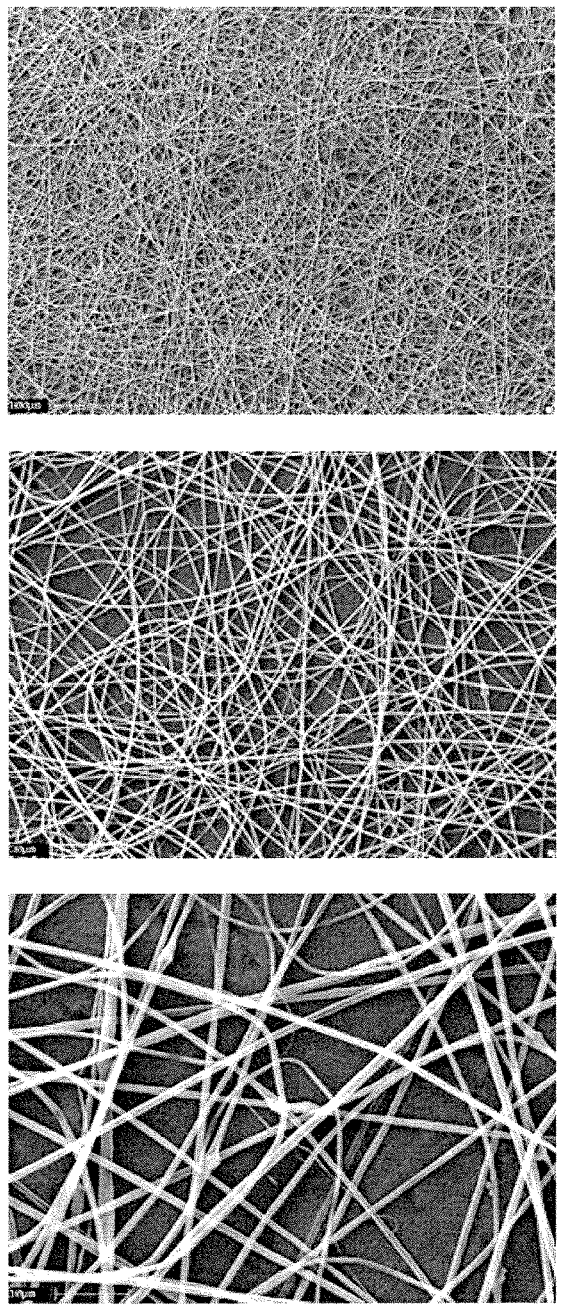
FIG. 5 shows SEM images of PHPS/PEO hybrid nanofibers at high molecular weight.

FIG. 5 shows examples of SEM images at a variety of magnification levels of PHPS/PEO hybrid nanofibers prepared by the currently disclosed methods. High molecular weight (600,000) of PEO, 2.5 wt % in THF/EtOH was mixed with PHPS solution at ratio of 1:0.5 PEO:PHPS.

Figure 6:
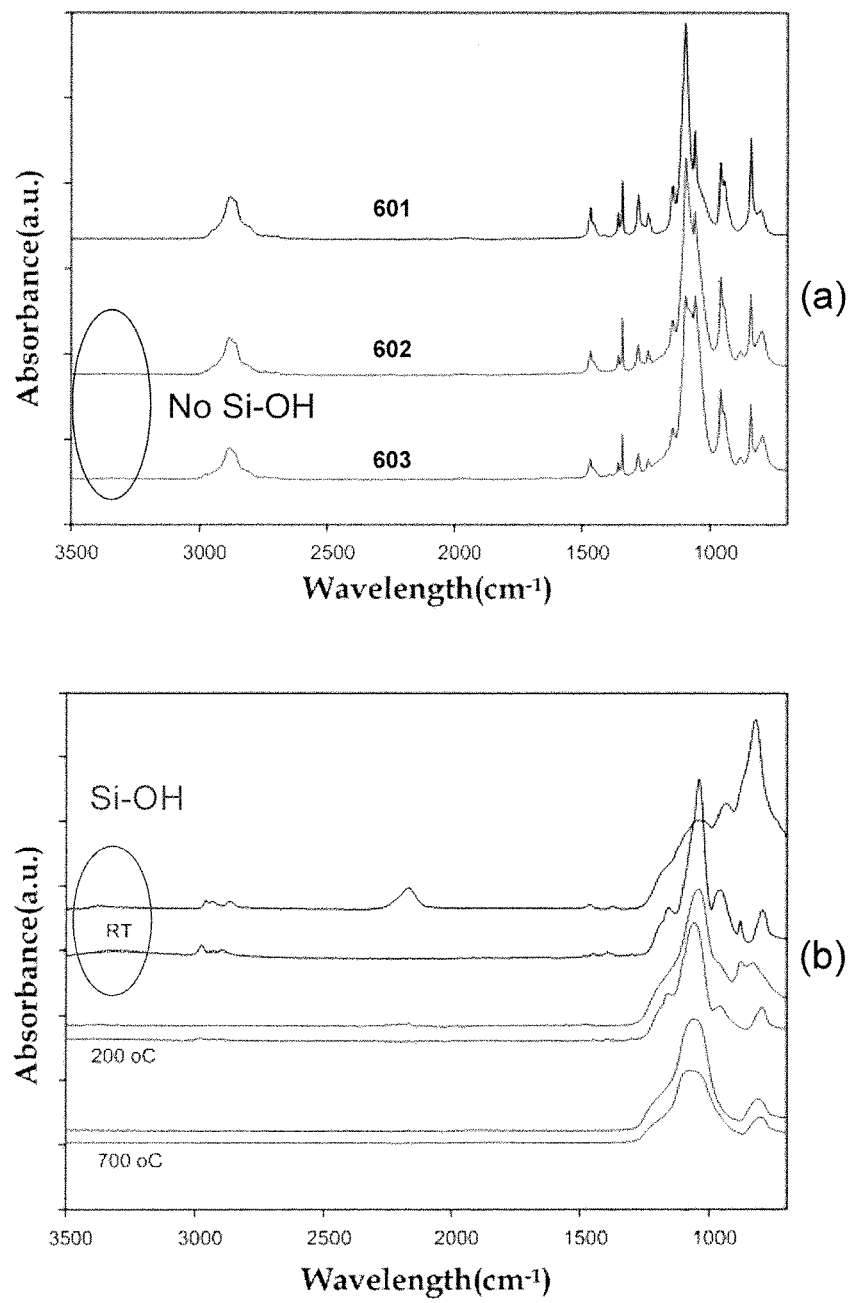
FIG. 6a FTIR analysis of PHPS/PEO nanofibers; 6b FTIR analysis of PHPS and TEOS.

FIG. 6a shows an FTIR analysis of PEO 601 and PHPS/PEO (30% precursor 602; 60% precursor 603) nanofibers prepared by the currently disclosed methods and at room temperature showing no Si—OH peaks indicating that there are no residual uncured Si—OH groups in the nanofiber, again showing that room temperature electrospinning provides complete curing of the PHPS ceramic precursor. FIG. 6b shows an FTIR analysis of PHPS and TEOS particles (at any given temperature, PHPS traces on top and TEOS traces on bottom) at a variety of temperatures (room temperature (rt), 200 C, and 700 C), which shows incomplete curing at RT. As can be seen a property of any nanofiber made according to the currently described process show no Si—OH groups. In other words, in some instances, processing of silazanes according the processes described herein provides improved curing parameters, with good curing even at room temperature.

Figure 7:
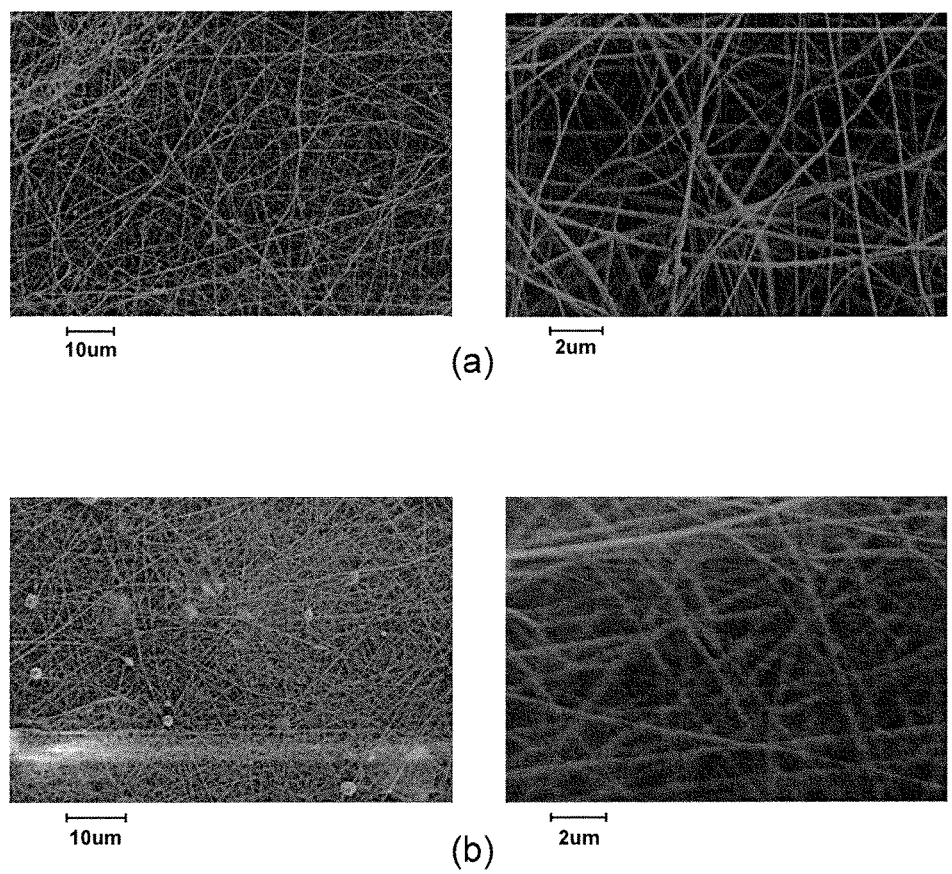
FIG. 7a SEM Images of pure m-aramid nanofibers; 7b SEM images of m-aramid/PHPS.

FIG. 7a shows SEM Images of pure m-aramid nanofibers at various magnifications. FIG. 7b shows SEM image of exemplary m-aramid/PHPS (NAX 120) hybrid nanofibers prepared by the currently disclosed methods (in this case at a ratio of 3:1 n-aramid/PHPS) at various magnifications.

Figure 8:
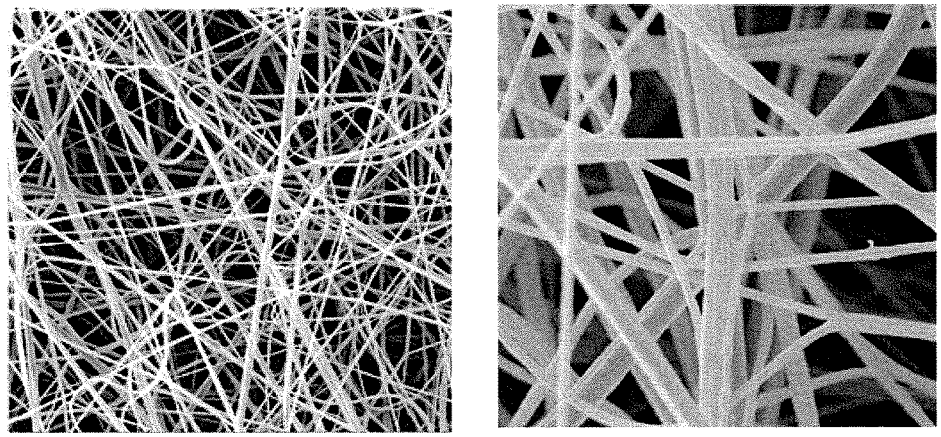
FIG. 8 SEM images of PHPS/m-aramid nanofibers at 8a 4.5% PHPS; 8b 9% PHPS
Figure 8:
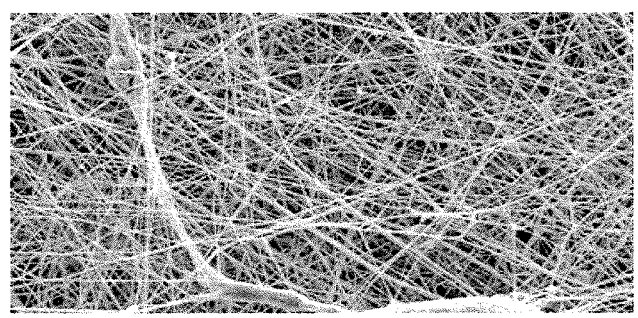
Figure 8:
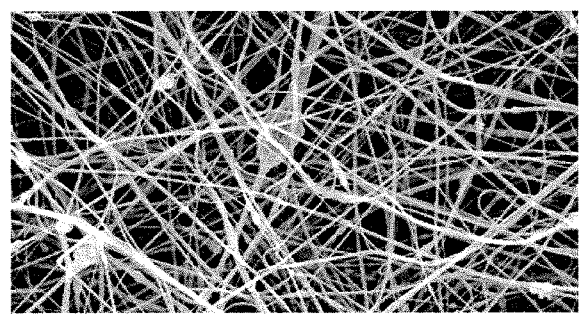

FIG. 8a shows SEM images at various magnifications of exemplary (cured) polysilazane (PHPS)/m-aramid nanofibers (in this case prepared using 4.5 wt % of organopolysilazane (KiON 1800) in the fluid stock) while FIG. 8b shows SEM images at various magnifications of other exemplary (cured) polysilazane/m-aramid nanofibers (in this case prepared using 9.0 wt % of organopolysilazane) in the fluid stock.

Figure 9:
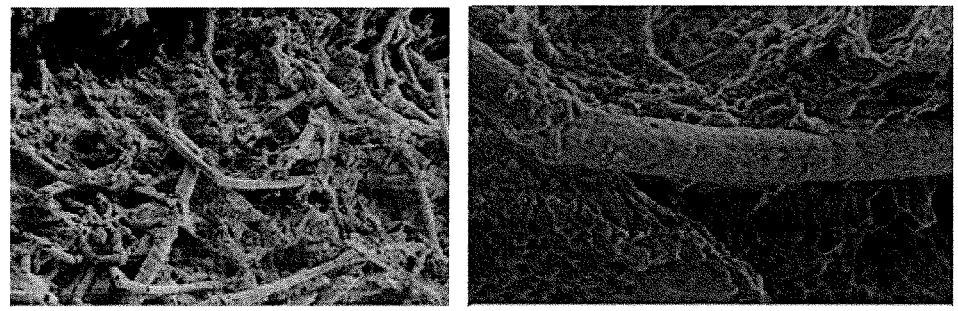
FIG. 9a Mesoporous silica nanofibers from PHPS/PEO (2:1) nanofibers by removing PEO with water; 9b EDX analysis of resulting mesoporous silica nanofibers.
Figure 9:
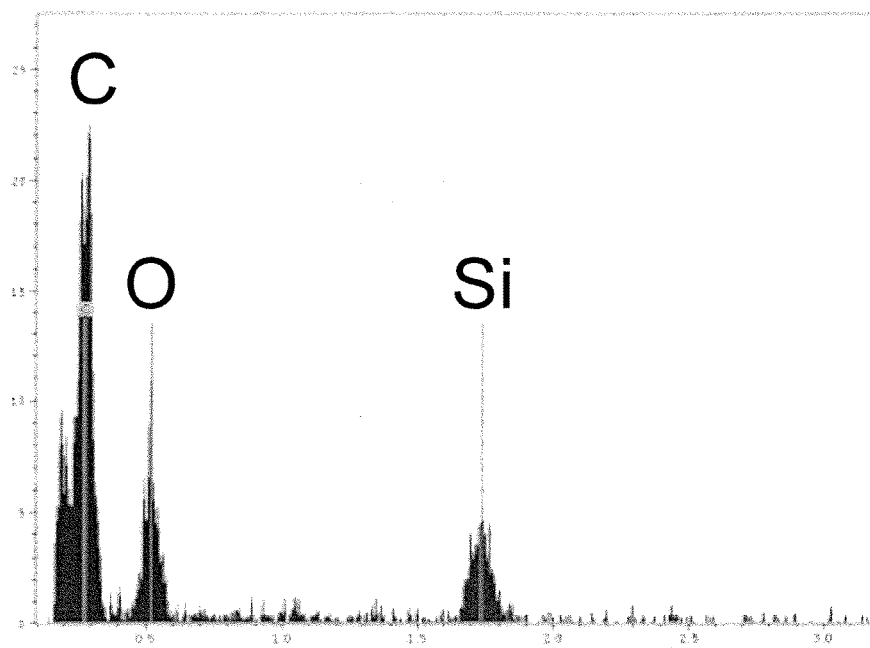

FIG. 9a show SEM images of exemplary ceramic/silicon oxide containing (e.g., mesoporous silica nanofibers) prepared by the currently disclosed methods of forming hybrid nanofibers from a fluid stock comprising polysilazane and polymer (in this case PHPS/PEO (2:1)) followed by removing polymer (PEO with water in this exemplary embodiment). FIG. 9b shows an EDX analysis of the exemplary (e.g., mesoporous silica) nanofibers showing that essentially all the PEO has been removed (e.g., providing a polysiloxane mesoporous nanofiber).

Figure 10:
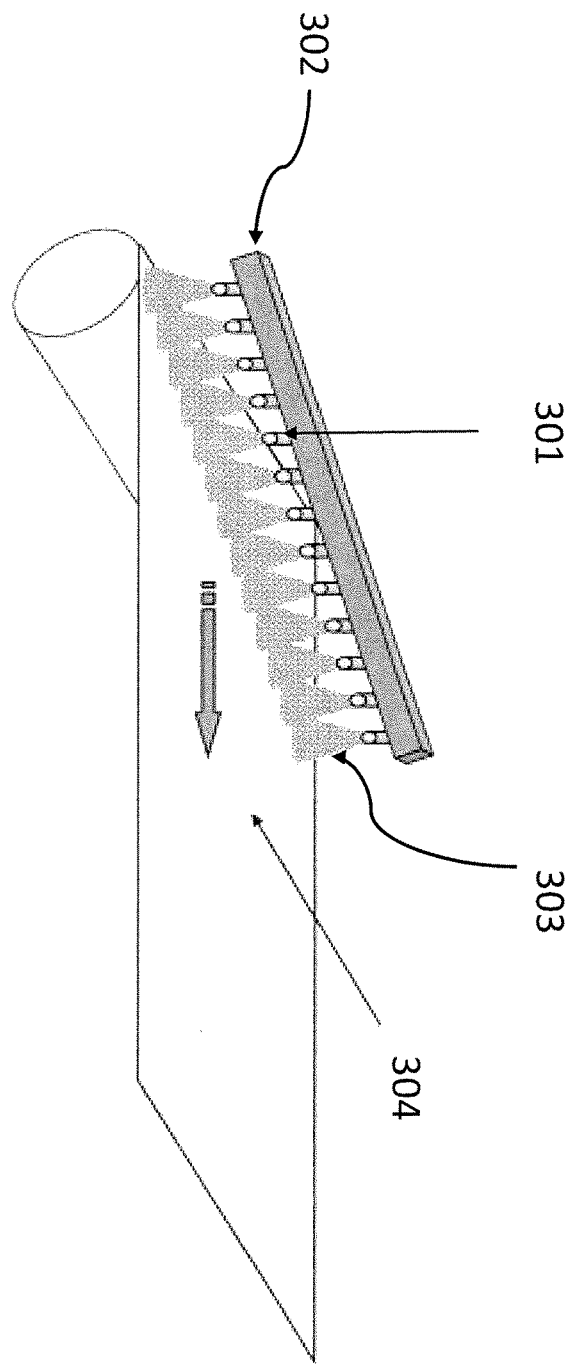
FIG. 10 illustrates a schematic of a series of electrospinning devices for the fabrication of a nanofiber matt film.

FIG. 10 illustrates a schematic of a series of electrospinning devices for the fabrication of a nanofiber matt film. In this illustration, multiple electrospinning nozzles similar to those in FIG. 1 or FIG. 2 are used. An array of electrified nozzles 301 are supplied with the same or different fluid stocks comprising ceramic precursors and, when present, polymer materials. A gas jet supplied by 302 provides for gas assisted electrospinning from each of the arrayed nozzles when gas assistance is desired. Electrospun nanofibers 303 are deposited on a flexible substrate 304. In this way roll to roll coating may be accomplished. Not shown are concentric and random arrays. These can be implemented in similar fashion to the array shown.

In specific embodiments, provided herein are ceramic/polymer composite nanofibers; membranes comprising such nanofibers, such as electrochemical cell separators (e.g., lithium battery—such as lithium ion battery—separators); and processes or preparing such nanofibers. In specific embodiments, the ceramic is a silicon oxide ceramic (such as silica, substoichiometric silica, or the like). In further or alternative specific embodiments, the polymer is polyacrylonitrile (PAN), polyethylene oxide (PEO), or the like. In various embodiments, the precursors utilized are perhydropolysilazane or organopolysilazane or a combination thereof. In specific embodiments, the precursor utilized is an organopolysilazane (e.g., of the general formula recited herein wherein at least one of $R^1$, $R^2$ or $R^3$ is an alkyl group, each (if present—e.g., not taken together with another group to form a ring) being independently selected from H, $CH_3$, $CH_2CH_3$, and $CH_2CH_2CH_3$). In specific embodiments, a process described herein utilizes a polymer to polysilazane weight ratio of about 60:40 to about 95:5, e.g., about 90:10, about 80:20, about 70:30, or the like. In certain embodiments, nanofibers described herein comprise about 3 wt % to about 45 wt % ceramic (e.g., about 5 wt % to about 40 wt %, or about 7 wt % to about 30 wt %) and about 55 wt % to about 97 wt % polymer (e.g., about 60 wt % to about 95 wt %, or about 70 wt % to about 93 wt %). In specific embodiments, such composite nanofibers comprise FT-IR bands at about 1037 $cm^{-1}$ and about 812 $cm^{-1}$. In some embodiments, the ceramic component of the nanofibers comprise nanostructured domains (e.g., isolated domain) within the nanofiber (e.g., polymer) matrix. In certain embodiments, the ceramic nanostructures have an average diameter of about 5 nm to about 50 nm, e.g., about 10 nm to about 40 nm. In certain embodiments, nanofibers provided herein have average pore sizes (i.e., in the range of about 0.25 microns to about 2.5 microns) of less than 0.7 microns.

Figure 11:
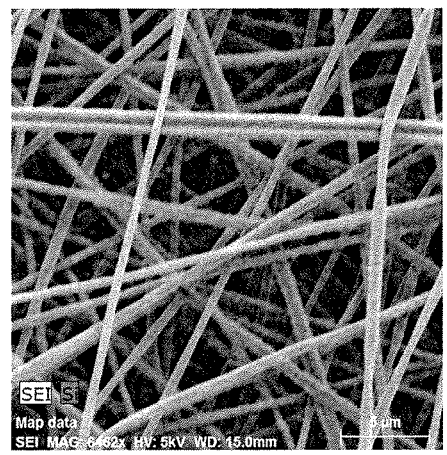
FIG. 11a illustrates an SEM image of exemplary nanofibers prepared using a 90:10 polysilazane/PAN weight ratio; 11b-11c various TEM images of the same.
Figure 11:
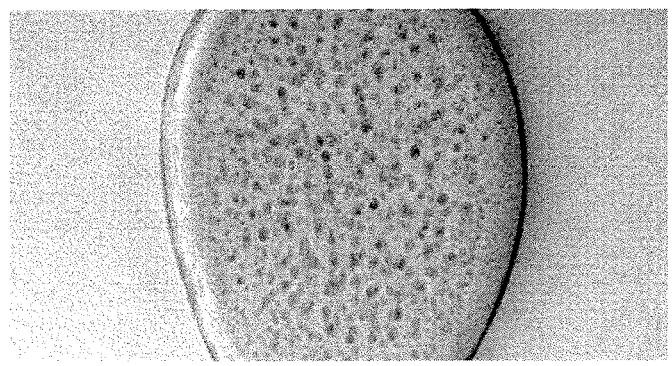
Figure 11:
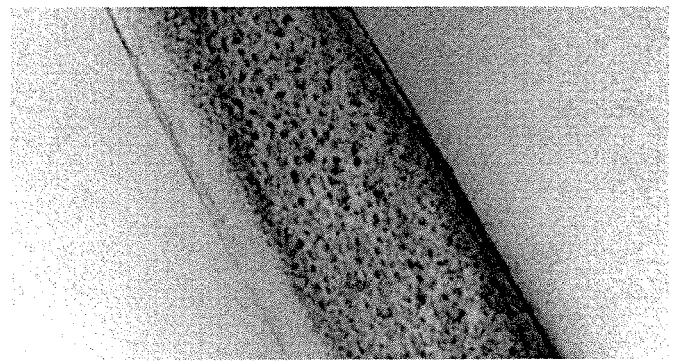
Figure 12:
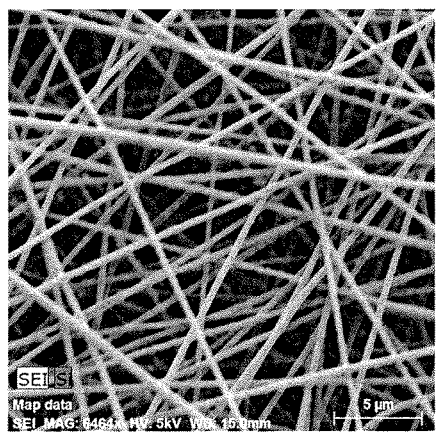
FIG. 12a illustrates an SEM image of exemplary nanofibers prepared using a 80:20 polysilazane/PAN weight ratio; 12b-12c various TEM images of the same.
Figure 12:
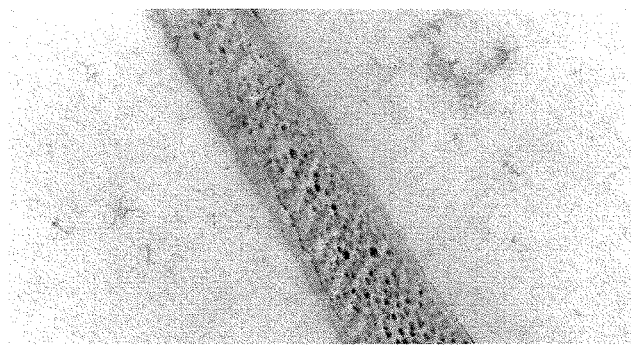
Figure 12:
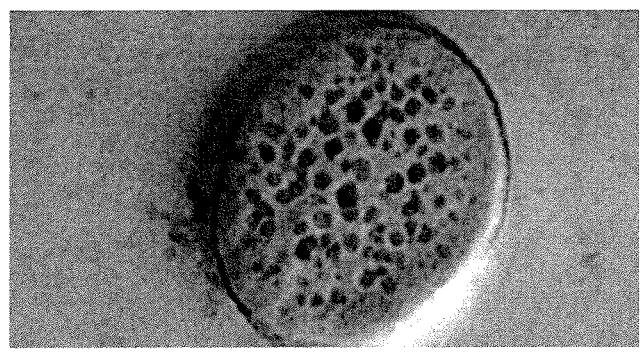
Figure 13:
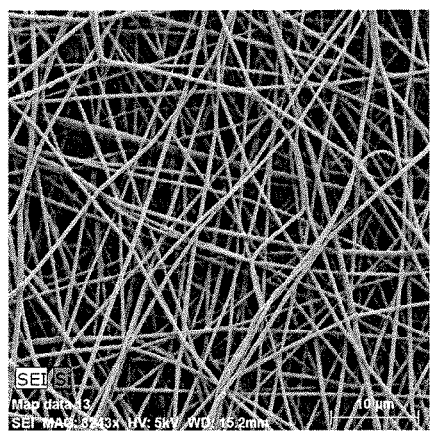
FIG. 13a illustrates an SEM image of exemplary nanofibers prepared using a 70:30 polysilazane/PAN weight ratio; 13b-13c various TEM images of the same.
Figure 13:
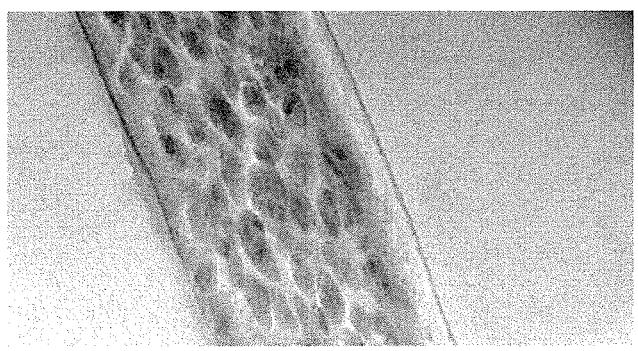
Figure 13:
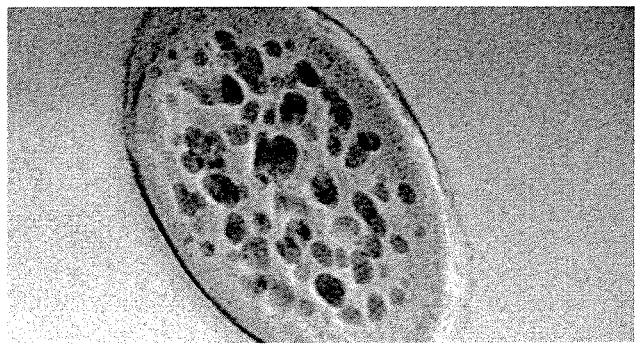
Figure 14:
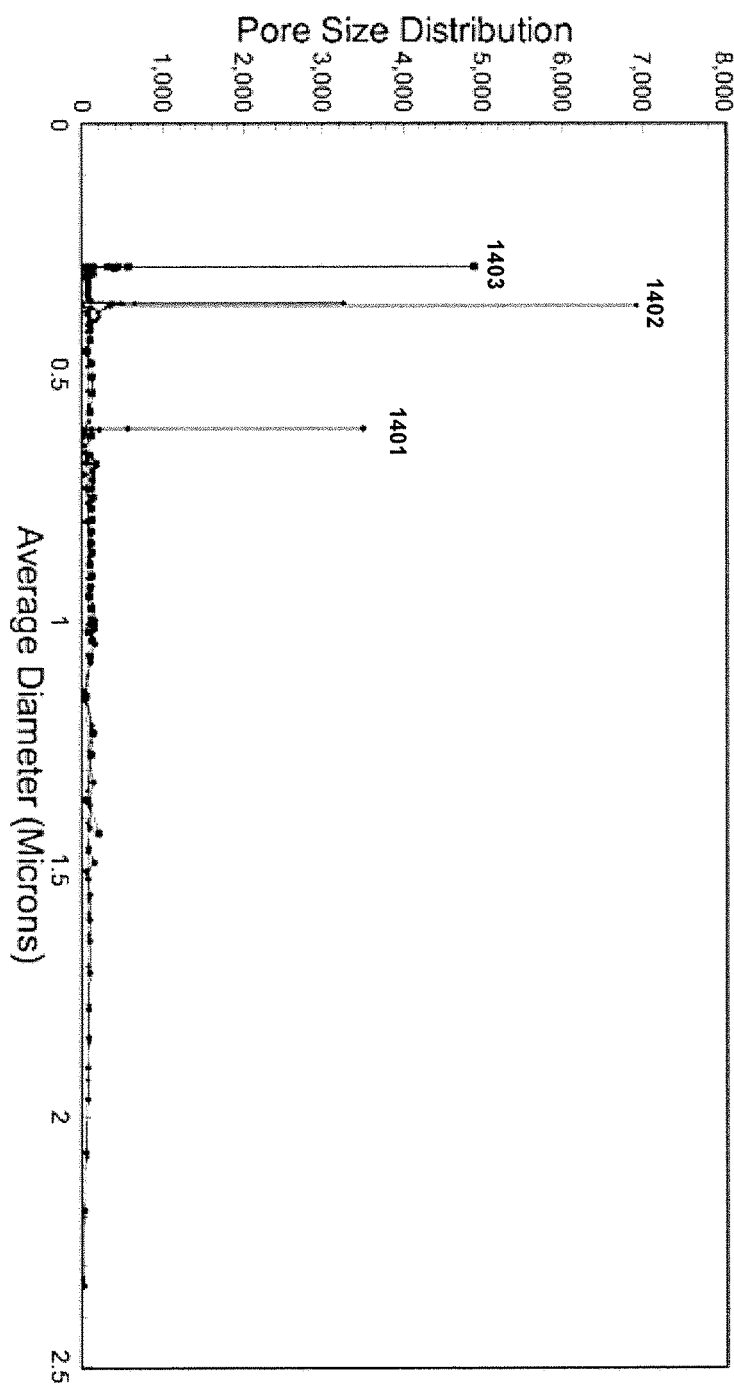
FIG. 14 illustrates pore size distribution of various exemplary nanofibers prepared using various polysilazane/PAN combinations.
Figure 15:
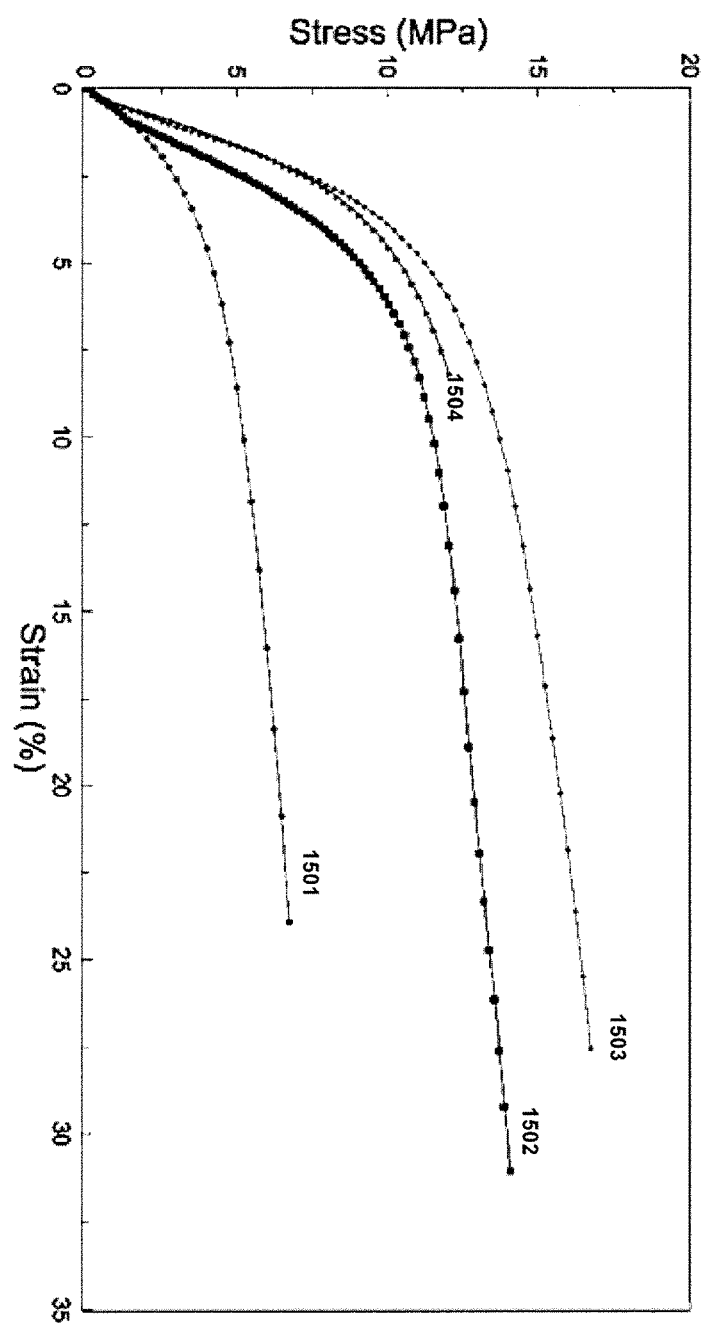
FIG. 15 illustrates a plot of stress versus strain for exemplary composite nanofibers prepared using various polysilazane/PAN combinations compared to PAN nanofibers alone.
Figure 16:
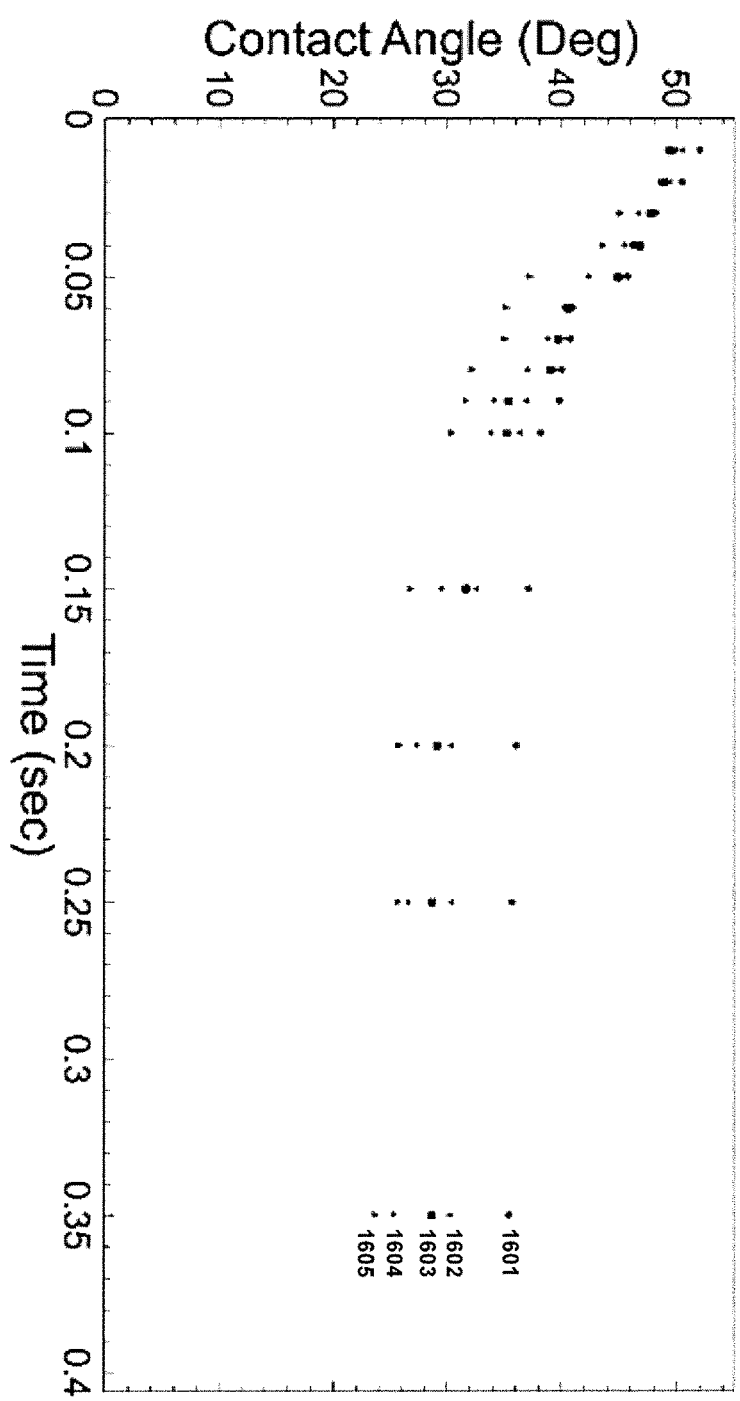
FIG. 16 demonstrates the contact angle of exemplary composite nanofibers prepared using various polysilazane/PAN combinations compared to polymer nanofibers and an exemplary polyolefin battery separator.
Figure 17:
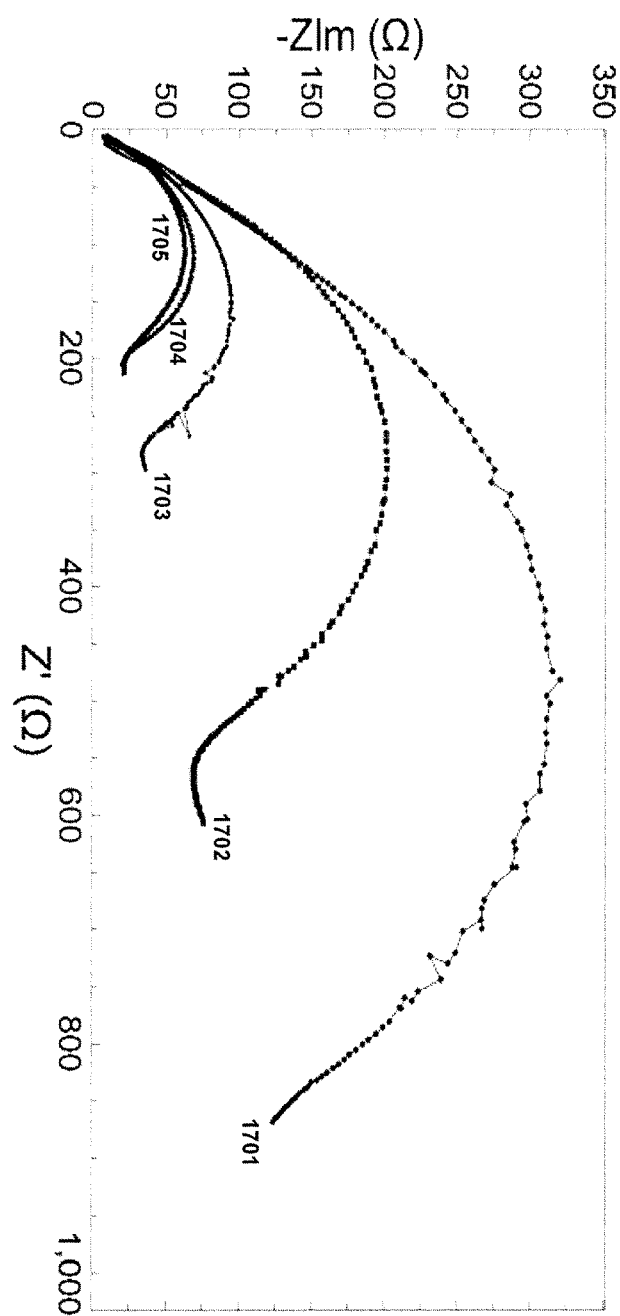
FIG. 17 illustrates the impedance of the exemplary polymer/ceramic nanofibers prepared using various polysilazane/PAN combinations compared to polymer nanofibers and an exemplary commercial polyolefin battery separator.
Figure 18:
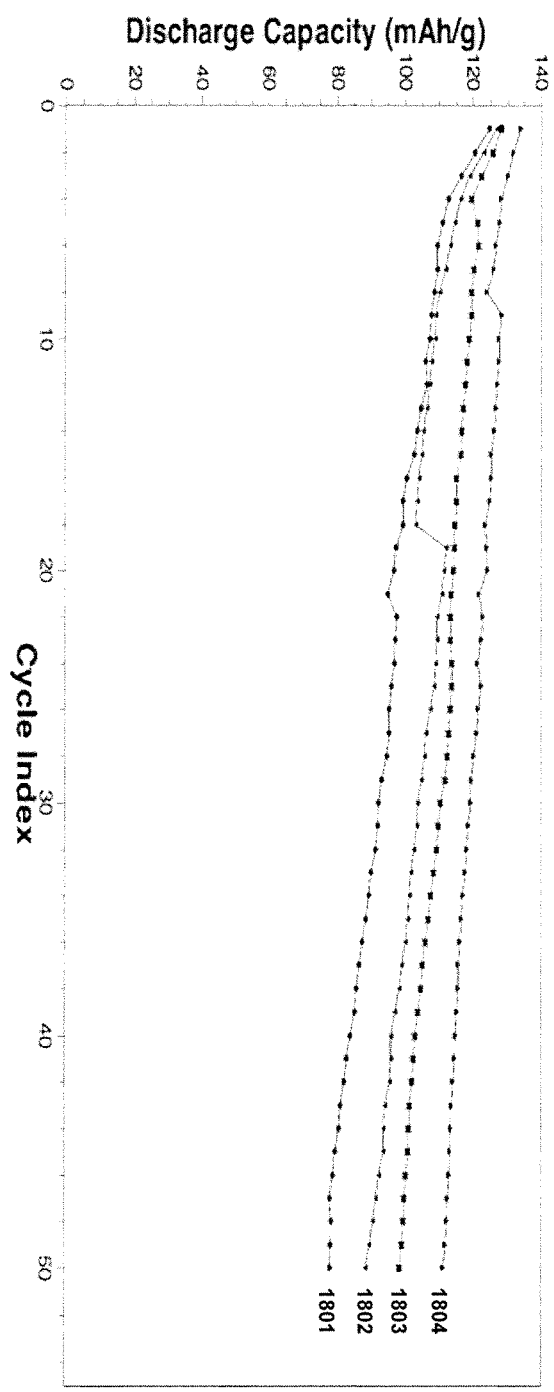
FIG. 18 illustrates discharge capacities of lithium ion battery half cells using exemplary polymer/ceramic nanofibers prepared using various polysilazane/PAN combinations compared to an exemplary commercial polyolefin battery separator.

FIG. 11 illustrates an SEM image of exemplary ceramic/polymer nanofibers prepared using a 90:10 polymer/ceramic precursor weight ratio (panel A), and various TEM images of the same (panels B-C). Silica domain sizes are, on average, about 10 nm in diameter. FIG. 12 illustrates an SEM image of exemplary nanofibers prepared using a 80:20 polymer/ceramic precursor weight ratio (panel A), and various TEM images of the same (panels B-C). Silica domain sizes are, on average, about 25 nm in diameter. FIG. 13 illustrates an SEM image of exemplary nanofibers prepared using a 70:30 polymer/ceramic precursor weight ratio (panel A), and various TEM images of the same (panels B-C). Silica domain sizes are, on average, about 38 nm in diameter. FIG. 14 illustrates tightly grouped and relatively small pore sizes (average diameter <0.7 microns on average) for exemplary nanofibers (e.g. prepared from PAN/polysilazane in a fluid stock ratio of 90:10 1401, a fluid stock ratio of 80:20 1402, and a fluid stock ratio of 70:30 1403). FIG. 15 illustrates a plot of stress versus strain for exemplary composite nanofibers (e.g. prepared from PAN/polysilazane in a fluid stock ratio of 90:10 1502, a fluid stock ratio of 80:20 1503, and a fluid stock ratio of 70:30 1504) compared to polymer nanofibers alone (PAN 1501). It was observed that inclusion of ceramic in the nanofibers increased the Young's modulus, and that at a certain point, the increased ceramic content led to increased brittleness in the fibers. FIG. 16 demonstrates the contact angle of exemplary composite nanofibers (e.g. prepared from PAN/polysilazane in a fluid stock ratio of 90:10 1603, a fluid stock ratio of 80:20 1604, and a fluid stock ratio of 70:30 1605) compared to polymer nanofibers (PAN 1602) and polyolefin battery separators (Celgard 1601). As can be seen, exemplary composite nanofiber mats have improved wettability compared to commercial polyolefin separators (e.g., Celgard). FIG. 17 illustrates the impedance of the exemplary polymer/ceramic nanofibers. Exemplary composite nanofibers (e.g., as mats in a separator system) are observed to have improved performance characteristics (e.g. prepared from PAN/polysilazane in a fluid stock ratio of 90:10 1703, a fluid stock ratio of 80:20 1704, and a fluid stock ratio of 70:30 1705) over pure PAN nanofibers 1702 and commercial polyolefin separators (such as Celgard 1701). FIG. 18 illustrates, using otherwise similar systems (half cells using $LiCoO_2$ as a cathode material) and analysis, how the discharge capacities and capacity retention are improved for exemplary composite nanofiber separator systems (e.g., using nanofibers prepared from PAN/polysilazane in a fluid stock ratio of 90:10 1802, a fluid stock ratio of 80:20 1803, and a fluid stock ratio of 70:30 1804) described herein compared to commercial polyolefin separators (Celgard 1801).

Other materials may be admixed with the ceramic precursor and/or the polymer material such as surfactants, leveling agents, plasticizers and other materials known to be of benefit to fibers. Functional additives may also be added.

In other embodiments metals may be included in the fluid stocks which provide conductivity or semiconductivity, magnetic properties, piezoelectric properties and the like, to the nanofiber, such as, for example, carboxylate salts of Ag, Al, Co, Ni, Zn, Zr, Si, Cu, Fe, Pb, Au, Cd, Li, Ti, Mn, Cr, Be, Si, V, Hf, Sr, Ba, Ge and combination thereof. Oxides of various metals may be included, such as, for example, $SiO_2$, $Al_2O_3$, $V_2O_5$, $VO_2$, $SnO$, $SnO_2$, $CuO$, $NiO$, $B_2O_3$, $Na_2O$, $K_2O$, $CaO$, $Li_2O$, $MgO$, $TiO_2$, $ZnO$, $MnO$, $Fe_2O_3$, $CoO$, $CoO_2$, $SrTiO_3$, $BaSrTiO_3$, and combinations thereof. Metals with ligands, metal alloys, conductive materials and other materials may be included depending on the desired properties of the prepared morphologically controlled, ceramic-polymer nanofibers.

In other embodiments carbon species may be included in the fluid stocks to provide conductivity or semiconductivity, such as, for example, graphenes, carbon nanotubes, fullerenes, and the like.

The nanofibers of the current disclosure have great potential for applications in a wide variety of fields, including membranes, high performance filtration, chemical sensing, biomedical engineering, renewable energy, batteries, membranes for Li-ion battery separators, capacitors, ultra capacitors, electrodes, solar cell applications, piezoelectrics, dielectric materials, macro- and micro-electronic materials, textiles, smart fibers, porous films, catalysts, absorbers, absorbers, membranes for filtration of materials such as pollutants, sensors, fabrics, smart fabrics, porous low-k dielectrics and other materials for the electronics and microelectronic industries and/or tissue regeneration matrices.

EXAMPLES

PHPS AZ® NAX120, AZ® NL120, AZ® NN120 (perhydrosilazane), and KiON 1500 and KiON 1800 (organopolysilazane) are examples of polysilazanes and can be obtained from AZ® Electronic Materials, Somerville, N.J., USA.

Example 1. Electrospinning of PHPS

Figure 3:
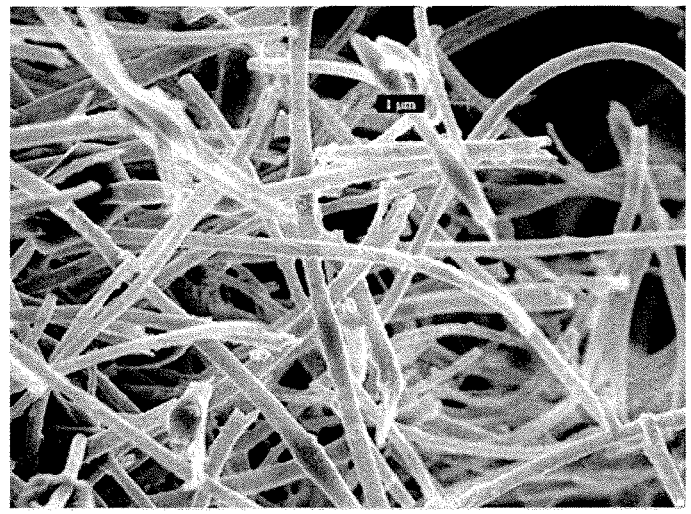
FIG. 3a an SEM image of silica nanofibers from electrospinning of PHPS solution; and 3b TGA analysis of electrospun PHPS fibers.
Figure 3:
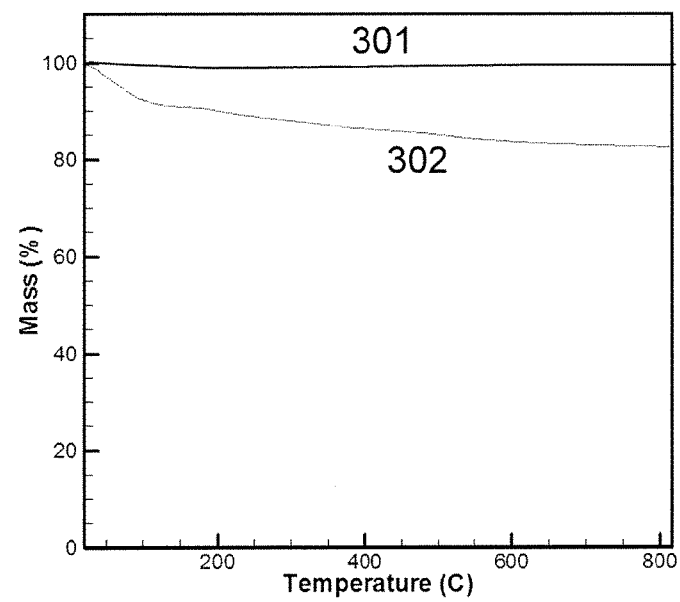

Spinning dope (NAX 120 PHPS solution) which has about 20 wt % of perhydrosilazane in dibutyl ether and alkylamine was placed into a 5 cc syringe with an 18 gauge needle with an inner diameter of about 0.84 mm. The high-voltage power supply was used to apply the positive charge to the needle. The collector was grounded. A micropump was used to infuse the solution and to eject it towards the collector. A voltage of 15 kV was maintained at the tip of the needle. The distance between the collector and the needle tip was about 15 cm. The flow rate of the solution was set to about 1.8 ml/hour. The spinning was done in a glovebox with limited $O_2$ and moisture level to control the curing. FIGS. 3 *a*) and *b*) show the SEM image of silica nanofibers from electrospinning of PHPS solution, and TGA analysis of electrospun PHPS fibers indicating that the curing was completed after electrospinning.

Example 2. Electrospinning of PHPS/PEO

Solution System 1:

Preparation A (Polymer): 0.64 g of polyethylene oxide (MW=approx. 200,000) was added to 10 g of a 95:5 blend ratio of tetrahydrofuran:ethanol and mixed at 40° C. for 60 min.

Preparation B (PHPS solution): 20 wt % of solid PHPS was dissolved in a 95:5 blend ratio of tetrahydrofuran:ethanol.

Spinning dope 1A: 0.565 g of Preparation B was added to Preparation A and stirred at room temperature for 60 min, representing a 15:85 solid ratio of PHPS:PEO Spinning dope 1B: 1.371 g of Preparation B was added to Preparation A and stirred at room temperature for 60 min, representing a 30:70 solid ratio of PHPS:PEO Solution System 2:

Preparation A (Polymer): 0.225 g of polyethylene oxide (MW=600,000) was added to 10 g of a 95:5 blend ratio of tetrahydrofuran:ethanol and mixed at 40° C. for 90 min.

Preparation B (PHPS solution): 20 wt % of solid PHPS was dissolved in a 95:5 blend ratio of tetrahydrofuran:ethanol.

Spinning dope 2A: 0.199 g of Preparation B was added to Polymer solution A and stirred at room temperature for 60 min, representing a 15:85 solid ratio of PHPS:PEO Spinning dope 2B: 1.125 g of Preparation B was added to Polymer solution A and stirred at room temperature for 60 min, representing a 50:50 solid ratio of PHPS:PEO Solution System 3:

Preparation A (Polymer): 0.152 g of polyethylene oxide (Mv=900,000) are added to 10 g of a 95:5 blend ratio of tetrahydrofuran:ethanol and mixed at 40° C. for 120 min.

Preparation B (PHPS solution): 20 wt % of solid PHPS was dissolved in a 95:5 blend ratio of tetrahydrofuran:ethanol.

Spinning dope 3A: 0.134 g of Preparation B was added to Polymer solution A and stirred at room temperature for 60 min, representing a 15:85 of PHPS:PEO Spinning dope 3B: 0.5 g of Preparation B was added to Polymer solution A and stirred at room temperature for 60 min, representing a 50:50 of PHPS:PEO Electrospinning process: One of the above PHPS:PEO spinning dopes was placed into a 5 cc syringe with an 18 gauge needle with an inner diameter of about 0.84 mm. A high-voltage power supply was used to apply the positive charge to the needle. A collector for collecting the electrospun nanofibers was grounded. A micro-pump was used to infuse the solution and to eject it towards the collector. A voltage of 15 kV was maintained at the tip of the needle. The distance between the collector and the needle tip was about 15 cm. The flow rate of the solution was set to about 1.8 ml/hour.

Example 3. Electrospinning of PHPS/m-Aramid

Preparation A (Polymer): 2 g of meta-aramid solution (18 wt % of polymer in DMAC solvent) was added to 1.3 g of DMAC solvent and mixed at 50° C. for 2 hours.

Preparation B (PHPS solution): 20 wt % of solid PHPS was dissolved in a 95:5 blend ratio of tetrahydrofuran:ethanol.

Spinning dope 4A: 0.26 g of Preparation B was added to Preparation A and mixed at low temperature (5° C.) and stirred for 60 min at a hot plate, representing a 10:90 solid ration of PHPS:Aramid.

Spinning dope 4B: 0.77 g of Preparation B was added to Preparation A and mixed at low temperature (5° C.) and stirred for 60 min at a hot plate, representing a 30:70 solid ration of PHPS:Aramid.

Electrospinning process: One of the above spinning dopes (4A-4B) was placed into a 5 cc syringe with a 18 gauge needle with an inner diameter of about 0.84 mm. A high-voltage power supply was used to apply the positive charge to the needle. A collector was grounded. A micro-pump was used to infuse the solution and to eject it towards the collector. A voltage of 15 kV was maintained at the tip of the needle. The distance between the collector and the needle tip was about 15 cm. The flow rate of the solution was set to about 0.5 ml/hour.

Example 4. Silica/PEO Nanofibers from Organopolysilazane

Example 2 was repeated except that organopolysilazane, KiON 1500 or KiON 1800 is used in place of the PHPS.

Example 5. Silica/n-Aramid Nanofibers from Organopolysilazane

Example 3 was repeated except that organopolysilazane, KiON 1500 or KiON 1800 is used in place of the PHPS.

Example 6. Ceramic ("Silica")/PAN Nanofibers from Organopolysilazane

Using a process similar to the Examples above, organopolysilazane was combined with PAN and electrospun to form ceramic/PAN hybrid nanofibers. Samples were prepared using PAN to organopolysilazane weight ratios of 90:10, 80:20, and 70:30. Analysis by TGA after curing demonstrates 26 wt % ceramic in the 7:30 samples, 17 wt % ceramic in the 80:20 samples, and 8 wt % ceramic in the 90:10 samples. Resultant nanofibers demonstrate Si—O—Si stretching at 1037 cm$^{-1}$ and Si—O—Si bending at 812 cm$^{-1}$ when investigated by FT-IR.

As can be seen in FIGS. 11-17, various parameters, such as ceramic domain size, pore size, and the like can be controlled by controlling the amount of ceramic precursor utilized, and that such composite nanofibers have improved characteristics over pure polymer nanofibers and, in the case of use as a battery separator, improved performance characteristics. FIG. 11 illustrates an SEM image of nanofibers prepared using a 90:10 PAN/OPSZ ratio (panel A), and various TEM images of the same (panels B-C). Silica domain sizes are, on average, about 10 nm in diameter. FIG. 12 illustrates an SEM image of nanofibers prepared using a 80:20 PAN/OPSZ ratio (panel A), and various TEM images of the same (panels B-C). Silica domain sizes are, on average, about 25 nm in diameter. FIG. 13 illustrates an SEM image of nanofibers prepared using a 70:30 PAN/OPSZ ratio (panel A), and various TEM images of the same (panels B-C). Silica domain sizes are, on average, about 38 nm in diameter. FIG. 14 illustrates tightly grouped and relatively small pore sizes (average diameter <0.7 microns on average) for the resultant nanofibers (e.g. prepared from PAN/polysilazane in a fluid stock ratio of 90:10 1401, a fluid stock ratio of 80:20 1402, and a fluid stock ratio of 70:30 1403). FIG. 15 illustrates a plot of stress versus strain for the composite nanofibers (e.g. prepared from PAN/polysilazane in a fluid stock ratio of 90:10 1502, a fluid stock ratio of 80:20 1503, and a fluid stock ratio of 70:30 1504) compared to PAN nanofibers alone 1501. It was observed that inclusion of ceramic in the nanofibers increased the Young's modulus, and that at a certain point, the increased ceramic content led to brittleness in the fibers. FIG. 16 demonstrates the contact angle of the composite nanofibers (e.g. prepared from PAN/polysilazane in a fluid stock ratio of 90:10 1603, a fluid stock ratio of 80:20 1604, and a fluid stock ratio of 70:30 1605) compared to PAN nanofibers 1602 and polyolefin battery separators (Celgard) 1601. As can be seen, composite nanofiber mats have improved wettability compared to commercial polyolefin separators (e.g., Celgard). FIG. 17 illustrates the impedance of the (cured) PAN/OPSZ nanofibers (e.g. prepared from PAN/polysilazane in a fluid stock ratio of 90:10 1703, a fluid stock ratio of 80:20 1704, and a fluid stock ratio of 70:30 1705). Increasing ceramic content generally being observed to reduce the impedance.

Further, composite nanofibers (e.g., as mats in a separator system) are observed to have improved performance characteristics over pure PAN nanofibers 1702 and commercial polyolefin separators (such as Celgard) 1701. Such results are illustrated in Table 1. FIG. 18 illustrates, using otherwise similar systems (half cells using $LiCoO_2$ as a cathode material) and analysis, how the discharge capacities and capacity retention are improved for composite nanofiber separator systems (e.g., using nanofibers prepared from PAN/polysilazane in a fluid stock ratio of 90:10 1802, a fluid stock ratio of 80:20 1803, and a fluid stock ratio of 70:30 1804) described herein compared to commercial polyolefin separators (Celgard) 1801.

TABLE 1

| Membrane | Bulk electrolyte resistance $R_b$ (Ω) | Interfacial resistance $R_{in}$ (Ω) | Ionic Conductivity (mS/cm) |
|---|---|---|---|
| Celgard | 2.909 | 1000 | 0.45 |
| PAN | 3.326 | 617 | 0.52 |
| PAN/10 wt % OPZ | 2.954 | 297 | 0.56 |
| PAN/20 wt % OPZ | 2.2 | 201 | 0.69 |
| PAN/30 wt % OPZ | 1.35 | 190 | 1.05 |

Example 7. Mesoporous Silica Nanofibers from PHPS/PEO Nanofibers

Using low MW (200,000) of polyethylene oxide (PEO) polymers 0.65 g of PEO polymer, MW 200,000 was dissolved in 10 g of a 95:5 blend ratio of tetrahydrofuran:ethanol and mixed at 40° C. for 60 min 1.73 g of a 20 wt % solution of PHPS solution was added. The spinning dope mixture was stirred at room temperature for 60 min.

The spinning dope was placed into a 5 cc syringe with an 18 gauge needle with an inner diameter of about 0.84 mm. A high-voltage power supply was used to apply the positive charge to the needle. A collector is grounded. A micro-pump was used to infuse the solution and to eject it towards the collector. A voltage of 15 kV was maintained at the tip of the needle. The distance between the collector and the needle tip was about 15 cm. The flow rate of the solution was set to about 1.8 ml/hour.

The PHPS/PEO hybrid nanofibers are collected on a copper collector for more than 1 hour and then taken out from the collector. The collected nanofibers were dipped into a water bath and then placed at 50° C. oven for 12 hours in order to dissolve the PEO polymers from the hybrid nanofibers removing the PEO from the nanofibers and forming mesoporous Silica nanofibers.

Using Low MW (600,000) of Polyethylene Oxide (PEO) Polymers 0.225 g of PEO polymer, MW 600,000 was dissolved in 10 g of a 95:5 blend ratio of tetrahydrofuran:ethanol and mixed at 40° C. for 90 min 0.5 g of a 20 wt % solution of PHPS solution was added. The spinning dope mixture was stirred at room temperature for 60 min.

The spinning condition and water treatment are the same as the aforementioned method. (The spun fiber mats and their mesoporous nanofiber mats are shown in FIGS. 1 and 2.

Using Low MW (900,000) of Polyethylene Oxide (PEO) Polymers 0.15 g of PEO polymer, MW 900,000 was dissolved in 10 g of a 95:5 blend ratio of tetrahydrofuran:ethanol and mixed at 40° C. for 120 min 0.3 g of a 20 wt % solution of PHPS solution was added. The spinning dope mixture was stirred at room temperature for 60 min.

The spinning condition and water treatment are the same as the aforementioned method.

Example 8. Mesoporous Silicon Nanofibers from Mesoporous Silica Nanofibers

The $SiO_2$ nanofibers obtained from Example 4 were exposed to Mg vapour in a vacuum furnace in order to convert the $SiO_2$ nanofibers to MgO and Si nanofibers. The $SiO_2$ nanofibers were placed in a sample container that contained Mg powders. The container was partially sealed in order to increase the exposure of Mg vapour to $SiO_2$ samples and then put into a vacuum furnace. The furnace heating rate was 2° C./min up to 700° C. and the duration time was 60 minutes, followed by cooling to room temperature at a rate of 5° C./min. An average vacuum pressure of 10-5 torr was applied.

After the vacuum heat treatment, the resulting samples were treated with 1M HCl to remove the MgO crystals. The Si/MgO nanofibers were soaked into 1M HCl solution for four hours. After the HCl treatment of the samples, the remaining nanofibers were washed in water two times and then were recovered through a filter paper. The final nanofibers were dried in air for one hour and then dried in a vacuum oven for overnight.

We claim:

1. A method for forming a ceramic-polymer hybrid nanofiber comprising the steps of:
    a. providing a fluid stock comprising precursor material and a polymer;
    b. electrospinning the fluid stock onto a substrate; and
    c. exposing the electrospun product to oxygen, water and an optional catalyst during spinning and/or following collection on the substrate,
    wherein the precursor material is selected from the group consisting of perhydropolysilazane, organopolysilazane, and combinations thereof; and
    wherein the ceramic-polymer hybrid nanofiber comprises polymer and a ceramic.

2. The method of claim 1, wherein within one hour of being exposed to oxygen, water and an optional catalyst, the electrospun product is a cured ceramic polymer hybrid nanofiber.

3. The method of claim 1, wherein the fluid stock comprises a catalyst.

4. The method of claim 3, where the catalyst is an amine.

5. The method of claim 1, wherein the temperature of electrospinning is about 300° C. or below.

6. The method of claim 5, wherein the process of electrospinning is performed at 50° C. or below.

7. The method of claim 5, wherein the method is performed without further thermal treatment.

8. The method of claim 1, wherein the degree of curing to a ceramic of the precursor material after electrospinning is above about 75%.

9. The method of claim 7, wherein the degree of curing to a ceramic of the precursor material after electrospinning is above about 75%.

10. The method of claim 1, wherein the process of electrospinning the fluid stock is gas assisted.

11. The method of claim 1, wherein the polymer material is at least one material chosen from the group consisting of poly(ethylene oxide), polyamide resins, aramid resins, poly(meta-phenyleneisophthalamide), polyalkylene oxides, polyolefins, polyethylenes, polypropylenes, polyethyleneterephthalates, polyurethanes, rosin ester resins, acrylic resins, polyacrylate resins, polyacrylamides, polyvinyl alcohols, polyvinyl acetates, polyvinyl ethers, polyvinylpyrollidones, polyvinylpyridines, polyisoprenes, polylactic acids, polyvinyl butyral resins, polyesters, phenolic resins, polyimides, vinyl resins, ethylene vinyl acetate resins, polystyrene/acrylates, cellulose ethers, hydroxyethyl cellulose, ethyl cellulose, cellulose nitrate resins, polymaleic anhydrides, acetal polymers, polystyrene/butadienes, polystyrene/methacrylates, aldehyde resins, polyacrylonitriles, cellulosic polymers, polyketone resins, polyfluorinated resins, polyvinylidene fluoride resins, polyvinyl chlorides, polybenzimidazoles, poly vinyl acetates, polyethylene imides, polyethylene succinates, polyethylene sulphides, polyisocyanates, SBS copolymers, polyglycolic acid, polypeptides, proteins, epoxy resins, polycarbonate resins, coal-tar pitch petroleum pitch and combinations thereof.

12. The method of claim 1, wherein the fluid stock comprises a weight ratio of precursor to polymer about 1:99 or more.

13. The method of claim 12, wherein the fluid stock comprises a weight ratio of precursor to polymer of about 15:35 to about 15:50.

14. The method of claim 1, wherein the nanofiber comprises a matrix with domains embedded therein, the matrix comprising the polymer and the domains comprising (i) the ceramic, (ii) the perhydropolysilazane, the organopolysilazane, or a combination thereof, or (iii) a combination thereof.

15. The method of claim 1, wherein the nanofiber comprises about 60 wt % to about 97 wt % polymer.

16. The method of claim 1, wherein the nanofiber comprises about 3 wt % to about 40 wt % ceramic.

17. The method of claim 15, wherein the nanofiber comprises about 3 wt % to about 40 wt % ceramic.

18. The method of claim 17, wherein the nanofiber comprises less than 5 wt % of perhydropolysilazane, organopolysilazane, or a combination thereof.

19. The method of claim 1, wherein the ceramic-polymer hybrid nanofiber is collected as a nanofiber mat, which undergoes a volume shrinkage of less than 5% when heated to a temperature below 300° C.

20. The method of claim 1, wherein the degree of curing to a ceramic of the precursor material during electrospinning is above about 75%.

21. The method of claim 7, wherein the degree of curing to a ceramic of the precursor material during electrospinning is above about 75%.

22. The method of claim 1, wherein the precursor cures to ceramic without the need of further thermal treatment.

23. The method of claim 5, wherein the precursor cures to ceramic without the need of further thermal treatment.

24. The method of claim 7, wherein the precursor cures to ceramic without the need of further thermal treatment.

25. A method for forming a battery separator, the battery separator comprising a nanofiber mat comprising one or more ceramic-polymer hybrid nanofiber, the method comprising the steps of:
   a. providing a fluid stock comprising organopolysilazane and polymer;
   b. electrospinning the fluid stock onto a substrate, the electrospinning being gas assisted; and
   c. exposing the electrospun product to oxygen and water during spinning and/or following collection on the substrate, wherein the ceramic-polymer hybrid nanofiber comprises polymer and ceramic.

26. The method of claim 25, wherein within one hour of being exposed to oxygen and water, the electrospun product comprises a cured ceramic polymer hybrid nanofiber.

27. The method of claim 25, wherein the temperature of electrospinning is about 50° C. or below.

28. The method of claim 27, wherein the method is performed without further thermal treatment.

29. The method of claim 28, wherein the degree of curing of organopolysilazane to ceramic is about 75% or more.

30. The method of claim 25, wherein upon collection of the electrospun material onto the substrate the degree of curing of the organopolysilazane to ceramic is about 75% or more.

31. The method of claim 25, wherein about 75% or more of the organopolysilazane is cured.

32. The method of claim 31, wherein about 95% or more of the organopolysilazane is cured.

33. The method of claim 25, wherein the polymer comprises poly(ethylene oxide), polyamide, aramid, poly(metaphenyleneisophthalamide), polyalkylene oxide, polyolefin, polyethylene, polypropylene, polyethyleneterephthalate, polyurethane, rosin ester resin, acrylic resin, polyacrylate resin, polyacrylamide, polyvinyl alcohol, polyvinyl acetates, polyvinyl ether, polyvinylpyrollidone, polyvinylpyridine, polyisoprene, polylactic acid, polyvinyl butyral resins, polyester, phenolic resin, polyimide, vinyl resin, ethylene vinyl acetate, polystyrene/acrylate, cellulose ether, hydroxyethyl cellulose, ethyl cellulose, cellulose nitrate resin, polymaleic anhydride, acetal polymer, polystyrene/butadiene, polystyrene/methacrylate, aldehyde resin, polyacrylonitrile, cellulosic polymer, polyketone resin, polyfluorinated resin, polyvinylidene fluoride, polyvinyl chloride, polybenzimidazole, poly vinyl acetate, polyethylene imide, polyethylene succinate, polyethylene sulphide, polyisocyanate, SBS copolymers, polyglycolic acid, epoxy resin, polycarbonate, coal-tar pitch petroleum pitch or a combination thereof.

34. The method of claim 33, wherein the polymer comprises polyacrylonitrile (PAN), polyvinylidene fluoride (PVDF), or a combination thereof.

35. The method of claim 25, wherein the fluid stock comprises a weight ratio of organopolysilizane to polymer about 1:99 or more.

36. The method of claim 35, wherein the fluid stock comprises a weight ratio of organopolysilizane to polymer about 5:95 to about 40:60.

* * * * *